(12) United States Patent
Wilson

(10) Patent No.: US 11,085,577 B1
(45) Date of Patent: Aug. 10, 2021

(54) DROP DOWN SUPPORT FOR CONTAINER AND CONTAINER INCLUDING DROP DOWN SUPPORT

(71) Applicant: Roger F. Wilson, Sarasota, FL (US)

(72) Inventor: Roger F. Wilson, Sarasota, FL (US)

( * ) Notice: Subject to any disclaimer, the term of this patent is extended or adjusted under 35 U.S.C. 154(b) by 0 days.

(21) Appl. No.: 17/072,313

(22) Filed: Oct. 16, 2020

(51) Int. Cl.
*F16M 11/38* (2006.01)
*B65D 25/00* (2006.01)

(52) U.S. Cl.
CPC ............. *F16M 11/38* (2013.01); *B65D 25/00* (2013.01); *F16M 2200/048* (2013.01)

(58) Field of Classification Search
USPC .... 248/132, 130, 161, 157, 163.1, 165, 166, 248/434, 168, 169, 170, 171, 439; 254/122, 126
See application file for complete search history.

(56) References Cited

U.S. PATENT DOCUMENTS

| | | | | |
|---|---|---|---|---|
| 2,227,764 A * | 1/1941 | Saunders | ............. | B60N 2/1892 248/397 |
| 2,587,255 A * | 2/1952 | Vogel | ................... | A47D 9/005 5/98.3 |
| 3,612,635 A | 10/1971 | Uyeda | | |
| 3,760,436 A * | 9/1973 | Zach | ...................... | A47C 21/00 5/118 |
| 3,904,853 A * | 9/1975 | Shoup | ................... | B66F 7/0633 235/51 |
| 4,589,621 A * | 5/1986 | Hunt | ...................... | F16M 11/10 248/421 |
| 4,706,817 A | 11/1987 | Greathouse | | |
| 5,598,591 A * | 2/1997 | Kelley | ................... | A47C 17/80 254/122 |
| 5,611,170 A | 3/1997 | McGuff et al. | | |
| 6,267,484 B1 | 7/2001 | Baker et al. | | |
| 8,991,599 B2 * | 3/2015 | Wilson | ...................... | B25H 3/06 206/373 |
| 9,415,503 B1 | 8/2016 | Ferragonio | | |
| 9,668,600 B1 | 6/2017 | Lau | | |
| 10,092,093 B2 | 10/2018 | Campbell, Jr. et al. | | |
| 10,527,221 B2 | 1/2020 | Grappe | | |
| 10,542,817 B2 * | 1/2020 | Swartz | ..................... | A47B 9/02 |
| 2002/0179181 A1 | 12/2002 | Murphy | | |
| 2005/0056750 A1 * | 3/2005 | Lai | ........................ | F16M 11/10 248/282.1 |
| 2006/0037873 A1 | 2/2006 | Elgart | | |

(Continued)

*Primary Examiner* — Alfred J Wujciak
(74) *Attorney, Agent, or Firm* — Caesar Rivise, PC

(57) ABSTRACT

A support device for a container holding various items and a container including a support device. The support device includes a top section, a base section and a pair of foldable strut assemblies connected diagonally between the top section and the base section. The top section either forms a portion of the container or the container is mounted on the top section. Each strut assembly includes a pair of legs pivotably connected together and configured to automatically pivot to an extended position when the support device is held above a support surface and a release mechanism actuated, whereupon the base section drops with respect to the top section into engagement with the support surface. A biasing mechanism is provided to assist in pivoting the legs to the extended position and holding the legs in that position.

11 Claims, 14 Drawing Sheets

(56) References Cited

U.S. PATENT DOCUMENTS

2008/0054149 A1* 3/2008 Freebairn ............... F16M 13/00
                                                    248/346.02
2014/0158647 A1* 6/2014 Geier ..................... F16M 11/08
                                                    211/26

* cited by examiner

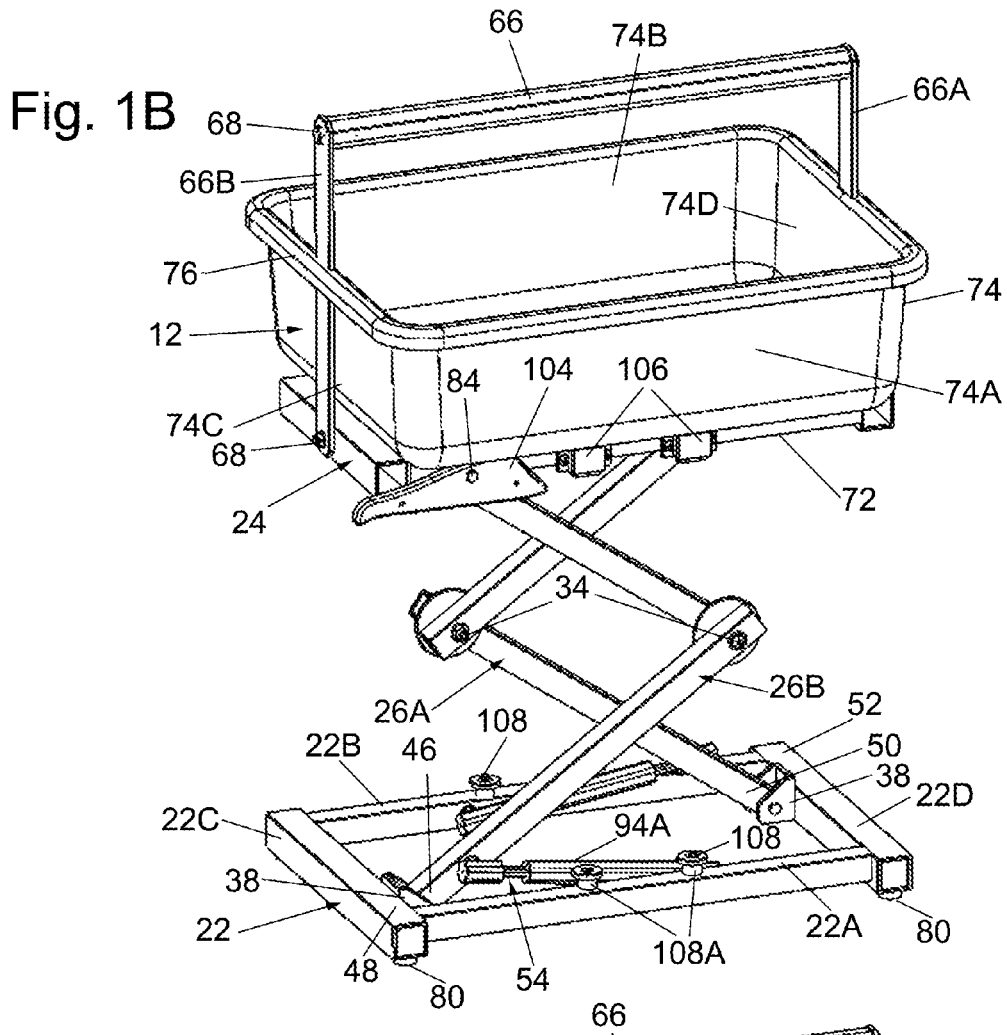
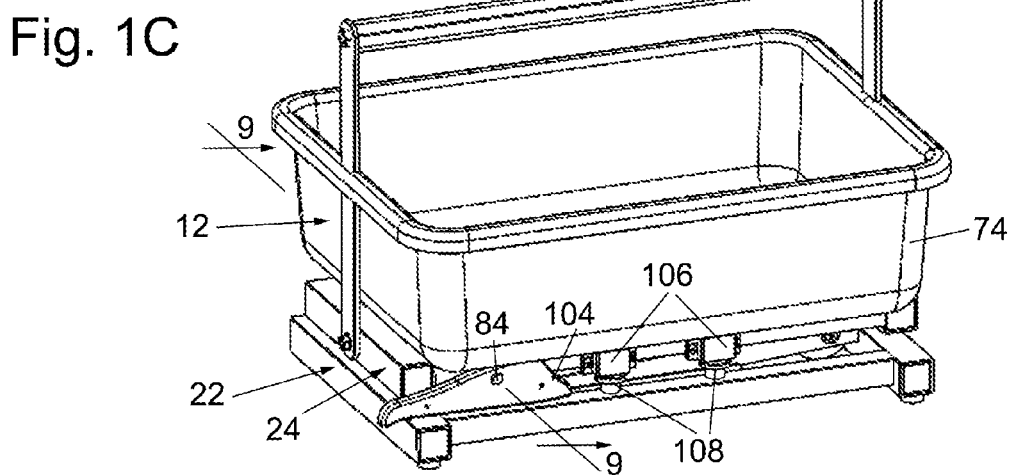

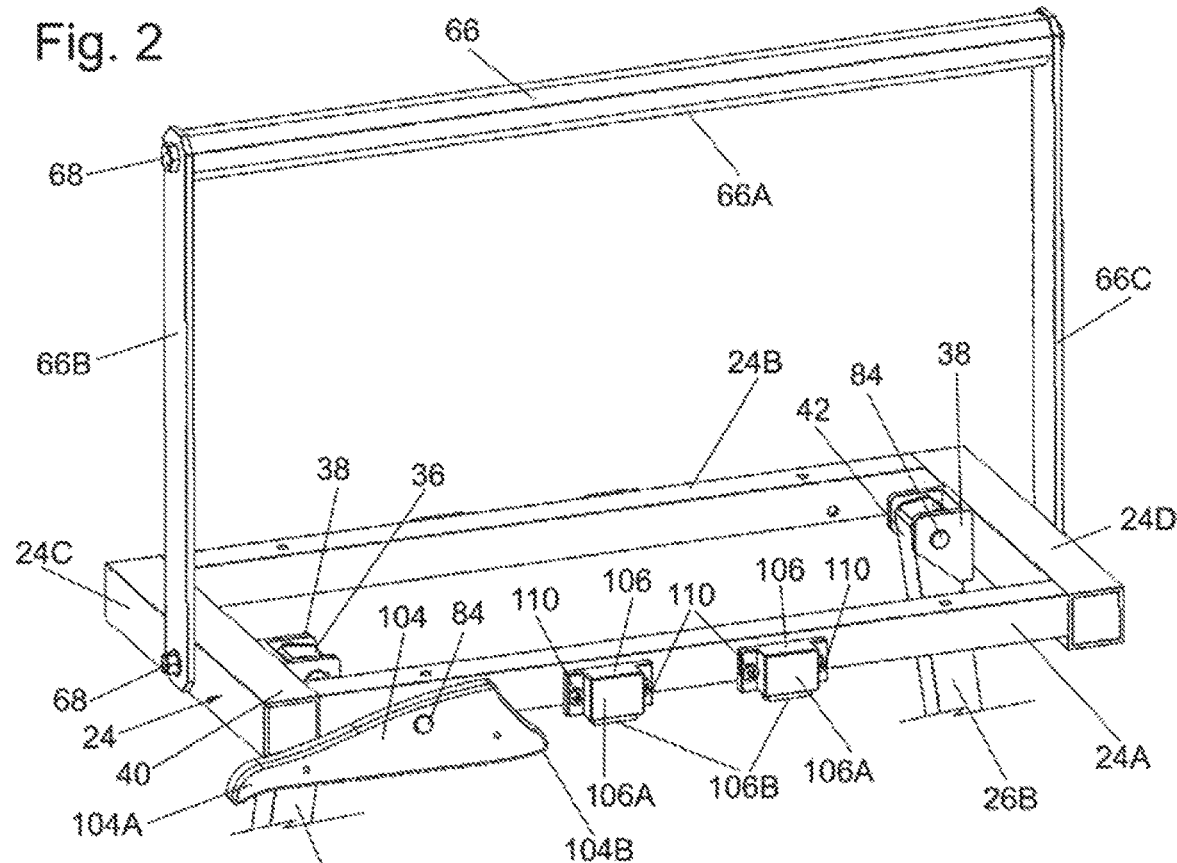
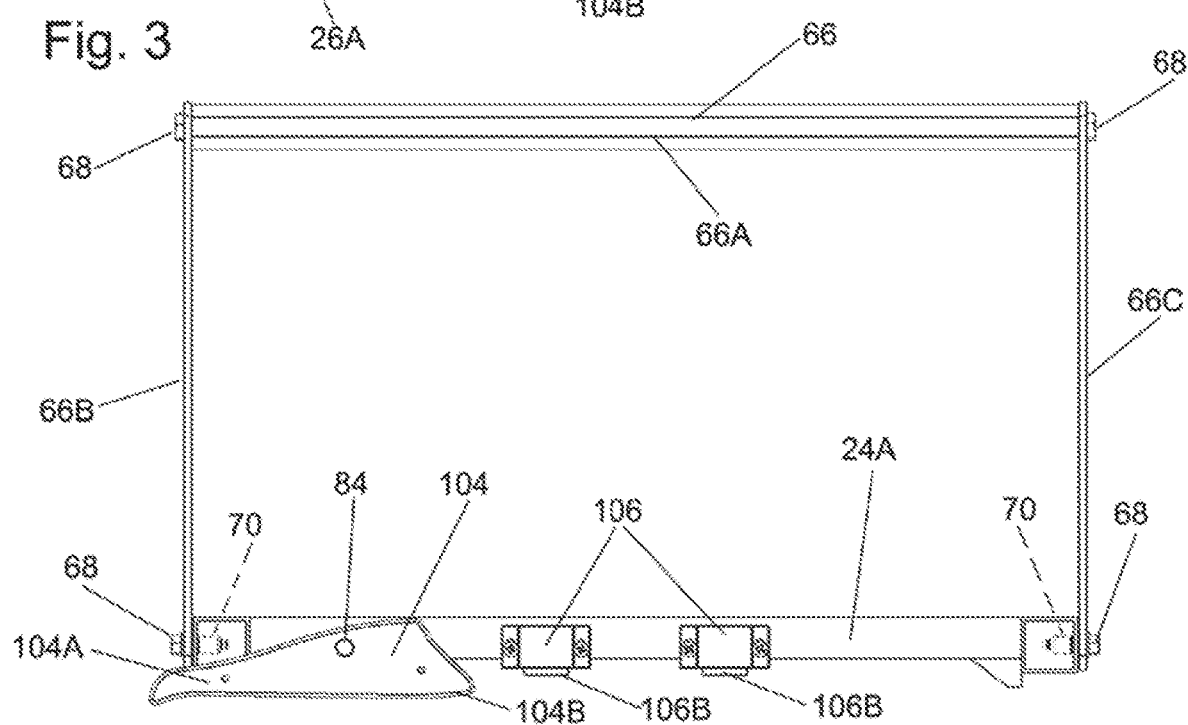

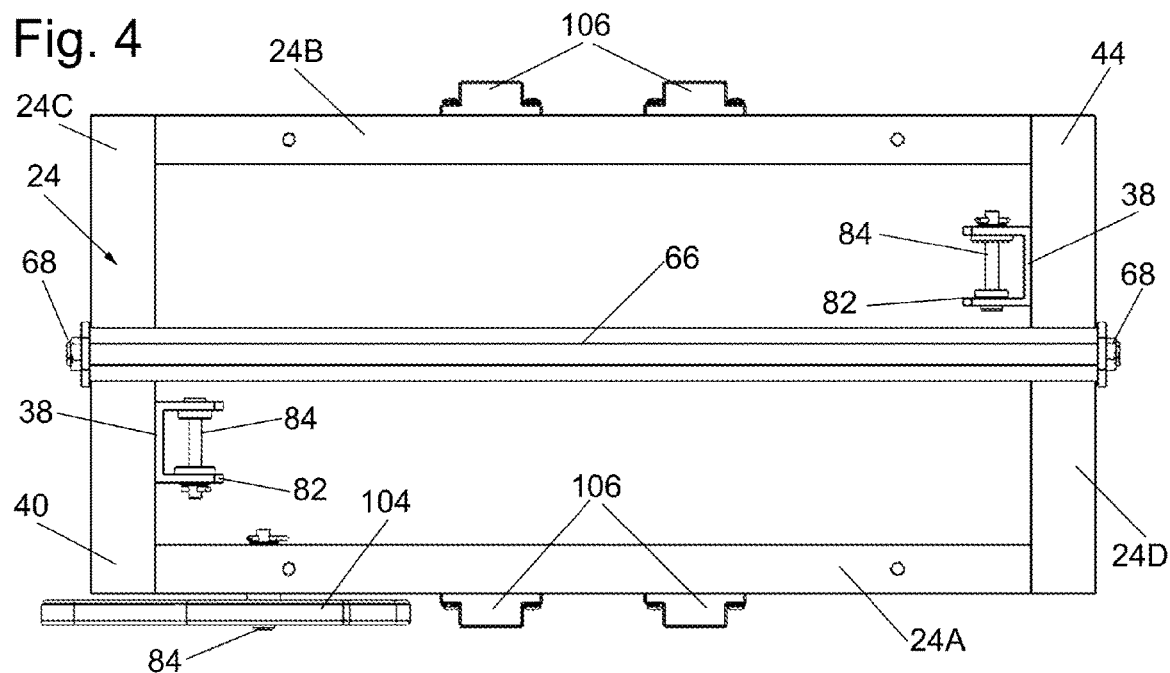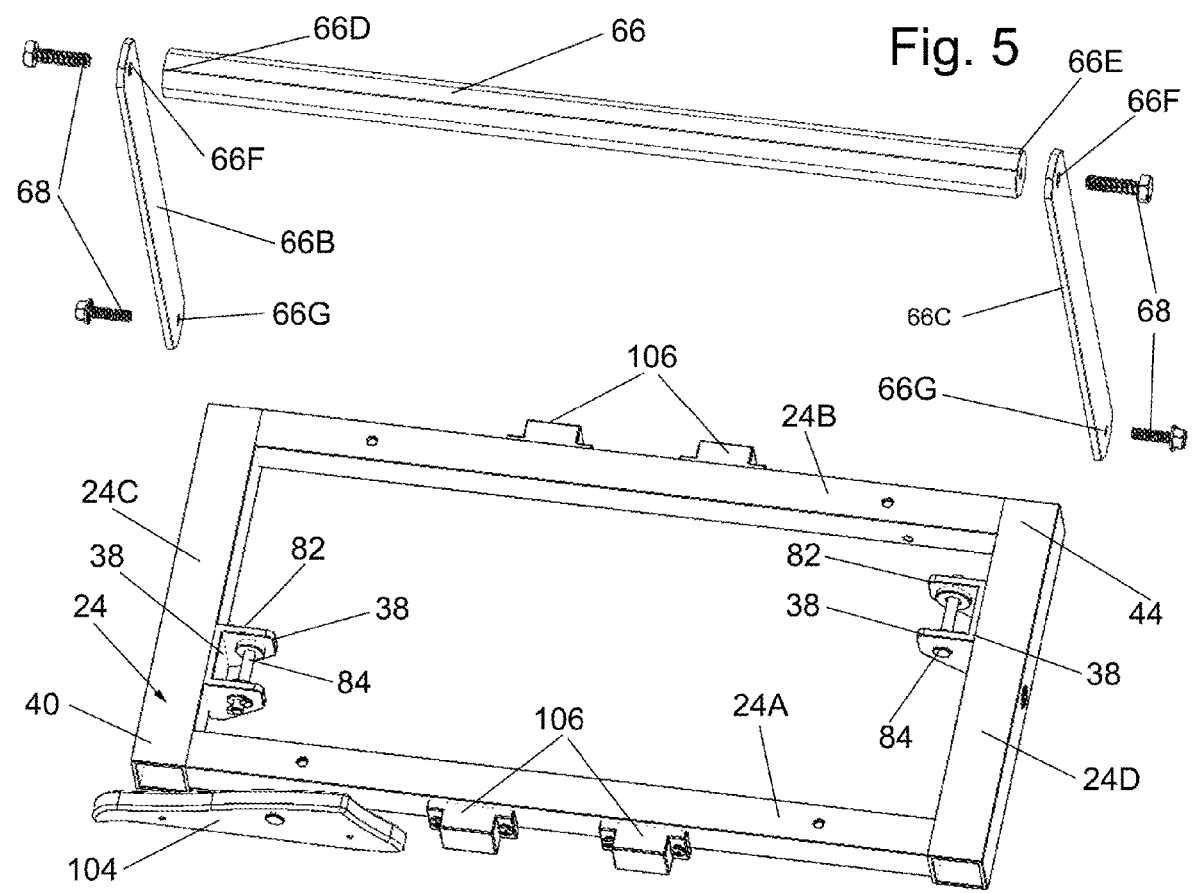

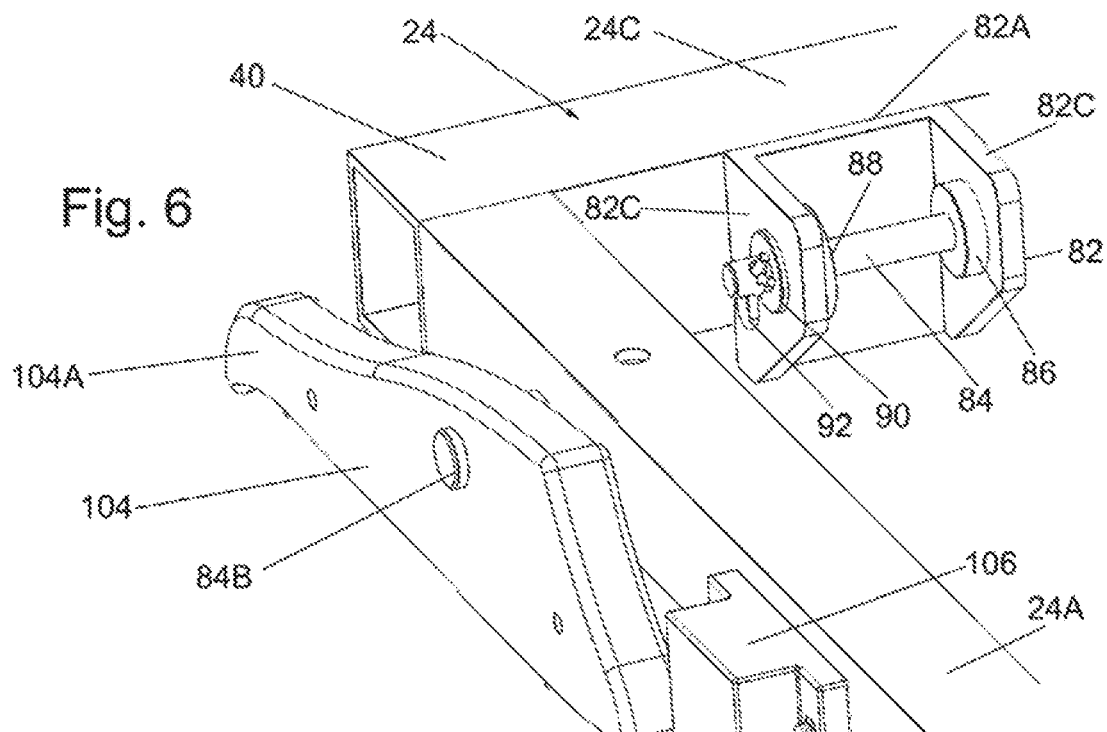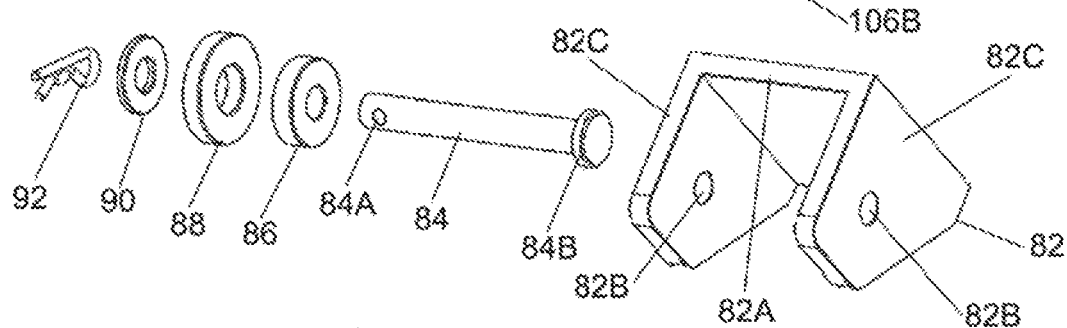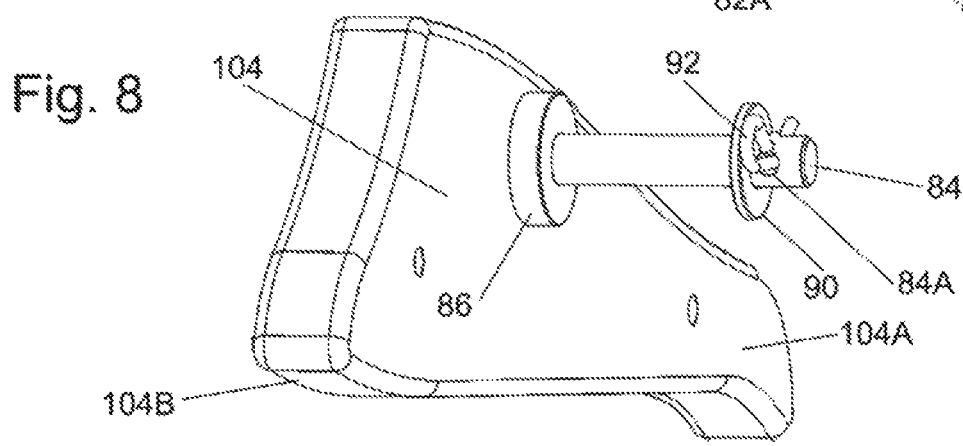

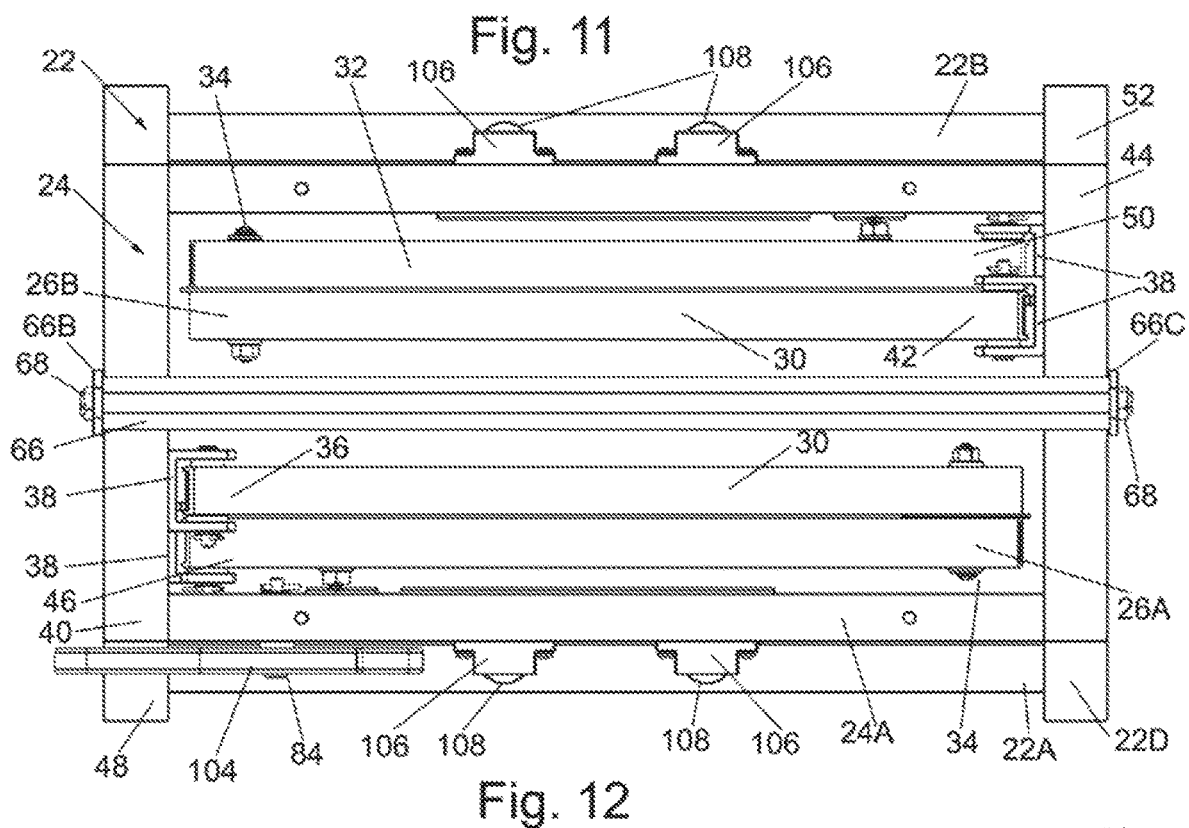

DROP DOWN SUPPORT FOR CONTAINER AND CONTAINER INCLUDING DROP DOWN SUPPORT

BACKGROUND OF THE INVENTION

This invention relates generally to container devices for transporting and holding hand tools and other small items and more particularly to container devices that include an extendable support which can be readily extended to hold the container at height that provides easy access, e.g., is comfortable for a standing person to access.

Tool carriers, portable storage boxes, tackle boxes, and simple open carriers and totes, made of wood and now common in plastic or metal have been around for a very long time. More recent examples of such boxes are shown in the patent literature. See for example, U.S. Pat. No. 3,612,635 (Uyeda et al.), U.S. Pat. No. 5,611,170 (McGuff et al.), and U.S. Pat. No. 6,267,484 (Baker et al.), which disclose tackle or tool boxes having plural trays which are arranged to be moved between a collapse or closed position and an extended or open position and vice versa. While such boxes may be generally suitable for their intended purposes, they nevertheless leave much to be desired from the standpoints of the range of function, compactness and convenience of use. For example, the extendable trays of those boxes are not capable of elevation to heights readily accessible by a standing user (unless the entire box is disposed at an elevated height, e.g., placed on a table or workbench).

The use of collapsible/extendable legs on a work-table or cart has also been known for a very long period of time. See for example U.S. Applications 2002/0179181A1 and 2006/0037873A1. However, such tables or carts are somewhat limited in their range of extension and compactness. Thus, they are not readily portable to carry hand tools or other small items.

In my U.S. Pat. No. 8,991,599, whose disclosure is specifically incorporated by reference herein, there is disclosed and claimed a pop-up tool carrier for holding and carrying various items, e.g., hand tools or other small items. The carrier includes a lower tray, an upper tray, a pair of foldable strut assemblies and a handle. Each strut assembly includes a pair of leg sections pivotably connected together. The strut assemblies are located at diagonally located corners of the trays with their leg sections arranged to be popped-up, e.g., pivoted, to an open position, whereupon the upper tray is disposed at a comfortable and convenient working height for a standing user and with the lower tray being exposed to provide ready access to any items in the lower tray. Torsion springs are provided to hold the tray in the extended or popped-up position.

While the device of my aforementioned patent is generally suitable for its intended purpose it nevertheless leaves something to be desired from the standpoints of simplicity of construction and easy of operation.

Accordingly, a need exists for a device that overcomes the limitations of the prior art. The subject invention addresses those needs.

SUMMARY OF THE INVENTION

One aspect of this invention is a support assembly configured to mount a container thereon, with the container being configured to hold one or plural items therein. The support assembly comprises a base section configured for disposition on a support surface, a top section disposed above the base section, a first strut assembly, a second strut assembly, and a release mechanism. The top section forms a portion of the container or is a separate component configured for receipt of the container thereon and is disposed above the base section for supporting the container thereon. Each of the strut assemblies has an upper end portion and a lower end portion and comprises a pair of legs pivotably connected together. The upper end portion of the first strut assembly is pivotably connected to a first portion of the top section. The upper end portion of the second strut assembly is pivotably connected to a second portion of the top section. The lower end portion of the first strut assembly is pivotably connected to a first portion of the base section. The lower end portion of the second strut assembly is pivotably connected to a second portion of the base section. The upper end portions and the lower end portions of the strut assemblies are pivotable with respect to each other in a first rotational direction from a collapsed state to an extended state, and pivotable with respect to each other in a second and opposite rotational direction from the extended state to the collapsed state. The release mechanism is configured for holding the strut assemblies in the collapsed state but is selectively releasable to selectively release the strut assemblies when the support assembly is in an elevated position above the support surface, whereupon the upper end portions and the lower end portions of the strut assemblies pivot with respect to each other in the first rotational direction from the collapsed state to the extended state, whereupon the base section engages and is disposed on the support surface, with the top section disposed substantially above the base section to enable a user to have ready access the container from a standing position.

In accordance with one preferred aspect of the support assembly of this invention the second portion of the top section is located diagonally to the first portion of the top section, and the second portion of the base section is located diagonally to the first portion of the base section.

In accordance with another preferred aspect of the support assembly of this invention, it additionally comprises a spring biasing mechanism for providing a bias force to at least one of the strut assemblies for holding the strut assemblies in the extended state.

In accordance with another preferred aspect of the support assembly of this invention, the spring biasing mechanism comprises at least one gas-spring.

In accordance with another preferred aspect of the support assembly of this invention, it is configured to enable a user to overcome the bias force on the strut assemblies to cause the upper end portions and the lower end portions of the strut assemblies to pivot with respect to each other in the second and opposite rotational direction from the extended state to the collapsed state.

In accordance with another preferred aspect of the support assembly of this invention, the release mechanism comprises a manually operable release member and a magnet assembly. The magnet assembly includes a first member secured to the top section and a second member secured to the base section. The first and second members are configured to be held together by a magnetic attractive force therebetween. The manually operable release member is configured to be moved from a hold state to a release state, whereupon the movement of the manually operable release member to the release state when the support assembly is in the elevated state above the support surface moves the second member away from the first member and overcomes the magnetically attractive force therebetween so that the base section drops from the top section and the strut assemblies pivot to the extended state.

In accordance with another preferred aspect of the support assembly of this invention, the manually operable release member comprises a lever, and wherein at least one of the first and second members of the magnet assembly comprises a permanent magnet.

In accordance with another preferred aspect of the support assembly of this invention, it additionally comprising a stop configured to be engaged by said strut assemblies when said strut assemblies are in said extended state.

In accordance with another preferred aspect of the support device of this invention, the container is selected from the group consisting of a tray, a tool bag, a tackle box and a thermally insulated container.

Another aspect of this invention is a container device for transporting and holding items and for disposition on a support surface. The container device comprises a container and a support assembly. The support assembly holds the container at an elevated position above the support surface and comprises a base section, a top section, a first strut assembly, a second strut assembly, and a release mechanism. The base section is configured for disposition on the support surface. The top section forms a portion of the container or is a separate component configured for receipt of the container thereon and is disposed above the base section for supporting the container thereon. Each of the strut assemblies has an upper end portion and a lower end portion and comprises a pair of legs pivotably connected together. The upper end portion of the first strut assembly is pivotably connected to a first portion of the top section. The upper end portion of the second strut assembly is pivotably connected to a second portion of the top section. The lower end portion of the first strut assembly is pivotably connected to a first portion of the base section. The lower end portion of the second strut assembly is pivotably connected to a second portion of the base section. The upper end portions and the lower end portions of the strut assemblies are pivotable with respect to each other in a first rotational direction from a collapsed state to an extended state and pivotable with respect to each other in a second and opposite rotational direction from the extended state to the collapsed state. The release mechanism is configured for holding the strut assemblies in the collapsed state but is selectively releasable to selectively release the strut assemblies when the support assembly is in an elevated position above the support surface, whereupon the upper end portions and the lower end portions of the strut assemblies pivot with respect to each other in the first rotational direction from the collapsed state to the extended state, whereupon the base section engages and is disposed on the support surface, with the top section disposed substantially above the base section to enable a user to have ready access to the container from a standing position.

In accordance with one preferred aspect of the container device of this invention the second portion of the top section is located diagonally to the first portion of the top section, and the second portion of the base section is located diagonally to the first portion of the base section.

In accordance with another preferred aspect of the container device of this invention, the support assembly additionally comprises a spring biasing mechanism for providing a bias force to at least one of the strut assemblies for holding the strut assemblies in the extended state.

In accordance with another preferred aspect of the container device of this invention, the spring biasing mechanism comprises a gas-spring.

In accordance with another preferred aspect of the container device of this invention, the support assembly is configured to enable a user to overcome the bias force on the strut assemblies to cause the upper end portions and the lower end portions of the strut assemblies to pivot with respect to each other in the second and opposite rotational direction from the extended state to the collapsed state.

In accordance with another preferred aspect of the container device of this invention, the release mechanism comprises a manually operable release member and a magnet assembly. The magnet assembly includes a first member mounted on the top section and a second member mounted on the base section. The first and second members are configured to be held together by a magnetic attractive force therebetween. The manually operable release member is configured to be moved from a hold state to a release state, whereupon the movement of the manually operable release member to the release state when the support assembly is in the elevated state above the support surface moves the second member away from the first member and overcomes the magnetically attractive force therebetween so that the base section drops from the top section and the strut assemblies pivot to the extended state.

In accordance with another preferred aspect of the container device of this invention, the manually operable release member comprises a lever, and wherein at least one of the first and second members of the magnet assembly comprises a permanent magnet.

In accordance with another preferred aspect of the container device of this invention, the support assembly additionally comprises a stop configured to be engaged by the strut assemblies when the strut assemblies are in the extended state.

In accordance with another preferred aspect of the container device of this invention, the container is selected from the group consisting of a tray, a tool bag, a tackle box, and a thermally insulated container.

DESCRIPTION OF THE DRAWING

FIG. 1B is an isometric view of the container device with its support assembly of FIG. 1A being shown in an intermediate (i.e., partially extended) state;

FIG. 1C is an isometric view of the container device with its support assembly of FIGS. 1A and 1B being shown in its retracted or collapsed state;

FIG. 2 is an enlarged isometric view of the top portion of the support assembly of FIG. 1A, but without the tool tray mounted thereon;

FIG. 3 is a side elevation view of the top frame assembly of the support assembly shown in FIG. 2;

FIG. 4 is a top plan view of the top section or frame of the support assembly shown in FIG. 2;

FIG. 5 is a partially exploded isometric view of the top section or assembly of the support assembly shown in FIG. 2;

FIG. 6 is an enlarged isometric view of one corner portion of the top section or frame shown in FIG. 5;

FIG. 7 is an exploded isometric view of some of the components shown in FIG. 6;

FIG. 8 is an enlarged isometric view of some other of components shown in FIG. 6;

FIG. 11 is a top plan view of the lower portion of the support assembly of FIG. 1A, when in its collapsed state with the top section or frame and the pivotable strut assemblies nested within the base section or frame;

FIG. 12 is a top plan view of the lower portion of the support assembly like shown in FIG. 11, but with the top section or frame omitted to show further details of the lower portion of the support assembly;

DETAILED DESCRIPTION OF PREFERRED EMBODIMENTS

Figure 1A:
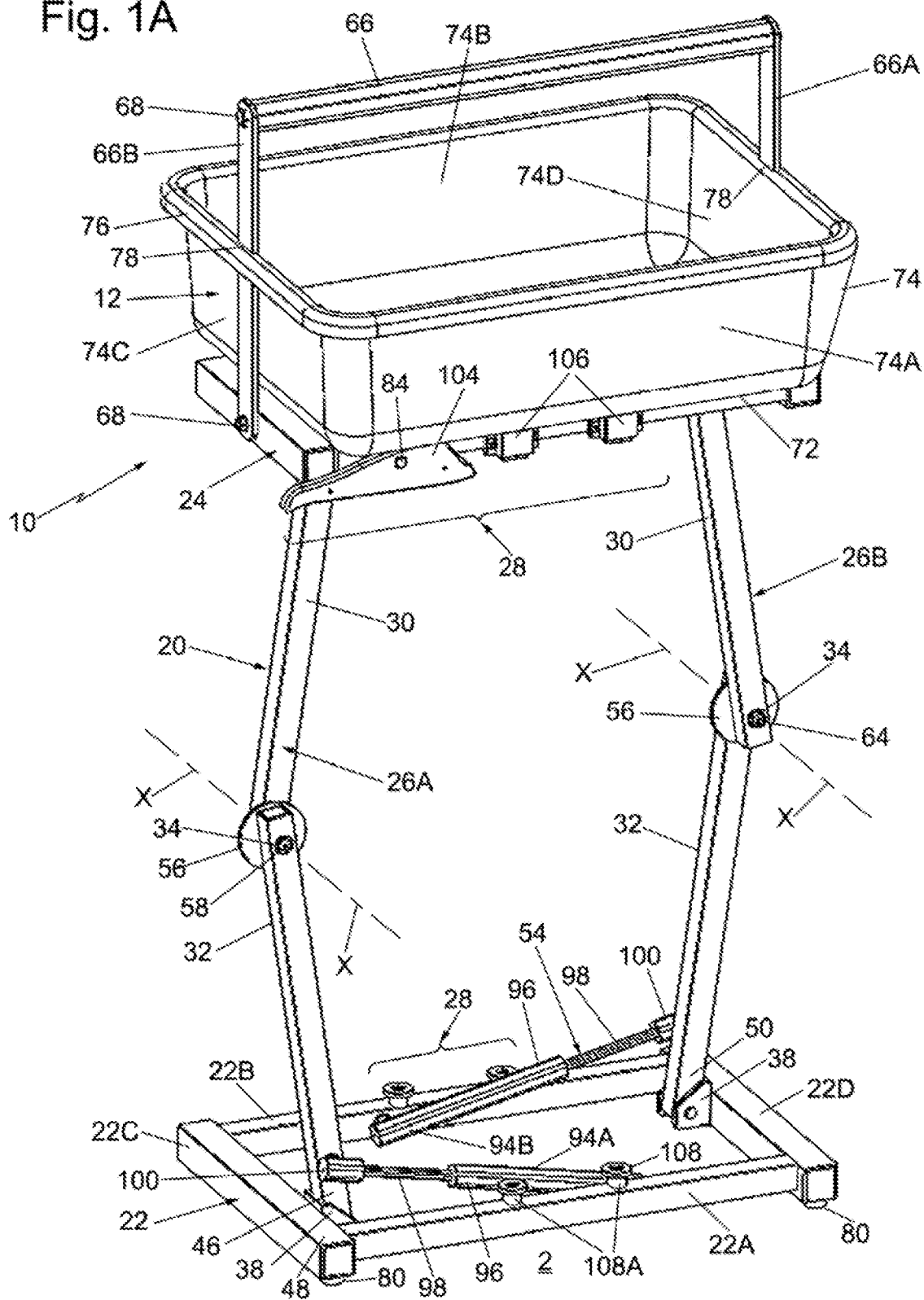
FIG. 1A is an isometric view of one exemplary embodiment of a container device constructed in accordance with this invention, with the container device being in the form of a tool tray mounted on a support assembly including a pair of pivotable strut assemblies shown in its fully extended state supporting the tool tray at an elevated position above a support surface.

Referring now to the various figures of the drawing wherein like reference characters refer to like parts, there is shown in FIG. 1A an exemplary embodiment of a container device 10 constructed in accordance with one exemplary embodiment of this invention. The container device 10 basically comprises a support assembly 20 on which a container, e.g., a tool tray 12, is mounted. The container device 10 is configured so that its support assembly 20 can be folded to a collapsed or compact state, like shown in FIG. 1C, for easy storage, yet automatically unfolded to an extended state like shown in FIG. 1A when the container device is held at an elevated position above a support surface 2 (e.g., the ground or a floor) and a release mechanism (to be described later) is actuated whereupon a portion of the support assembly drops down to the extended state under the influence of gravity and with the assistance of a biasing mechanism (also to be described later). Inasmuch as the support assembly is constructed to automatically drop down to the extended position when the container device is in its collapsed state and held above the support surface and the release mechanism actuated, the support assembly can be called a "drop-down" assembly. That assembly should be contrasted to the operation of the device of my aforementioned patent, which can be characterized as having a pop-up support assembly. In any case, once the container device of this invention is in its extended state like shown in FIG. 1A its base section (to be described shortly) will be located on the support surface, with the tool tray 12 being held in the elevated position above the support surface so that a user of the device can readily access the interior of the tray from a standing position or sitting position.

Figure 15:
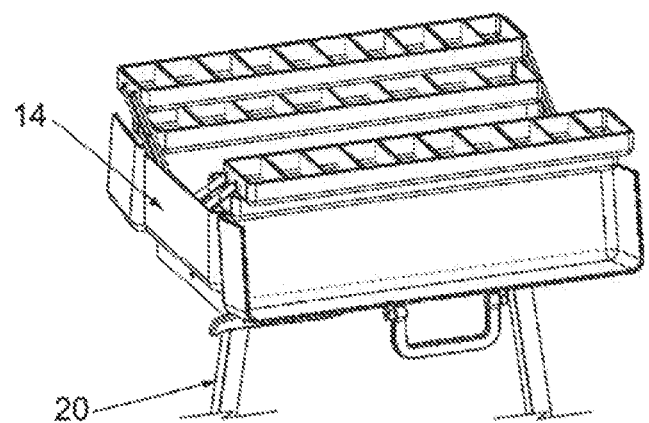
FIG. 15 is an isometric view of an alternative exemplary embodiment of a container in the form of a tackle box on a support assembly like that of FIG. 1A.
Figure 16:
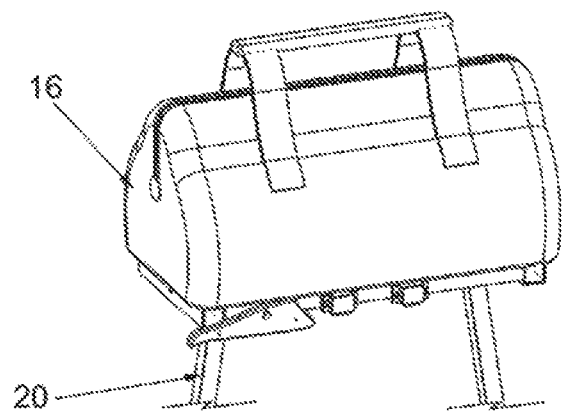
FIG. 16 is an isometric view of still another alternative exemplary embodiment of a container in the form of a soft tool case on a support assembly like that of FIG. 1A.
Figure 17:
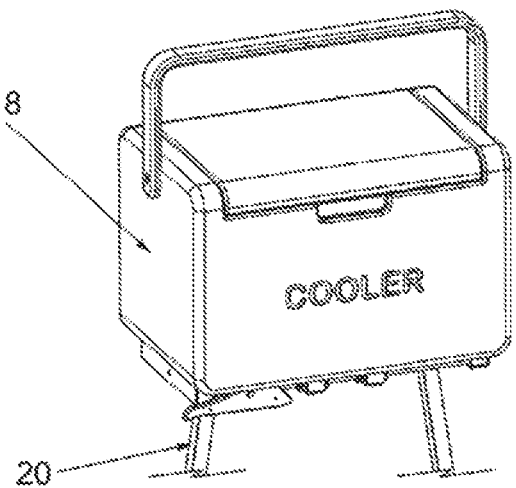
FIG. 17 is an isometric view of yet another alternative exemplary embodiment of a container in the form of a cooler box on a support assembly like that of FIG. 1A.

Three other exemplary embodiments of this invention making use of the support assembly are shown in FIGS. 15-17, Those other exemplary embodiments all make use of the drop-down support assembly 20, but with that support assembly holding some container other than the tool tray 12. In particular FIG. 15 shows the drop-down support assembly 20 holding a conventional tackle-box 14. FIG. 16 shows the drop-down support assembly 20 holding a conventional soft tool bag 16, FIG. 17 shows the drop-down support assembly 20 holding a conventional cooler 18. It must be stated at this juncture that the drop-down support assembly 20 can be used to mount other types of containers than those shown so that when the drop-down support assembly is in its extended state access can be had to the container mounted on the support assembly by a standing or sitting user. Thus, the drop-down support assembly of the subject invention can be used with any container for holding tools or other small items at an elevated position to enable a user to readily reach the tool or item when drop-down support assembly of the resulting container device is in its extended state, yet be readily collapsed to the collapsed state for transport and storage.

As best seen in FIGS. 1A-1C the drop-down support assembly 20 basically comprises a base section 22, a top section 24, a first strut assembly 26A, a second strut assembly 26B, and a release mechanism 28. The base section 22 is in the form of a frame assembly, which will be described in detail later, and is configured for disposition on the support surface 2. The top section 24 is in the form of a frame assembly, which will also be described in detail later, and is located above the base section and configured for supporting the container, e.g., tool tray 12, thereon.

The strut assemblies 26A and 26B are modular, e.g., are of identical construction, in the interest of simplicity and reduced component costs. Each strut assembly comprises a pair of elongated linear tubular legs or sections 30 and 32, formed of any suitable strong yet light-weight material, e.g., aluminum, which are pivotably connected together at a pivot joint 34. As best seen in FIGS. 2, 4 and 11, the upper end 36 of the upper leg 30 of the first strut assembly 26A is pivotably connected by a hinge 38 (whose details will be described later) to the top section 24 adjacent a first corner 40 of the top section 24. The upper end 42 of the upper leg 30 of the second strut assembly 26B is pivotably connected by a similar hinge 38 to the top section 24 adjacent a second corner 44 of top section 24. The second corner 44 of the top section is located diagonally opposite to the first corner 40 of the top section. As best seen in FIGS. 1A, 10, 11 and 12, the lower end 46 of the lower leg 32 of first strut assembly 26A is pivotably connected by another hinge 38 to the base section 22 adjacent a first corner 48 of the base section 22. The lower end 50 of the lower leg 32 of the second strut assembly 26B is pivotably connected by a similar hinge 38 to the base section 22 adjacent a second corner 52 of base section 22. The second corner 52 of the base section is located diagonally opposite to the first corner 48 of the base section. Accordingly the strut assemblies 26A and 26B are located somewhat diagonally to each other between the top section 24 and the base section 22 in a manner somewhat similarly to the arrangement of the strut assemblies of my aforementioned United States patent to provide similar advantages. In particular, the somewhat diagonal positioning of the strut assemblies 26A and 26B of this invention with respect to the top section 24 and the base section 22 aids in providing stability for the tray 12 on the top section. Moreover, it facilitates the collapsing of the strut sections in a nested configuration like that shown in FIG. 11 when the support assembly 20 is in its collapsed state. Further still, the diagonal arrangement minimizes the number of components required to connect the top section 24 to the base section 22 so that they can be extended and retracted with respect to each other. In particular, it only requires two strut assemblies instead of one strut assembly for each corner of the top section and the base section.

The upper and lower legs 30 and 32, respectively, of each strut assembly are pivotable with respect to each other about the pivot axis X of the pivot joint 34. By being so connected the legs 30 and 32 of each strut assembly can be pivoted in a first rotational direction about the axis X from the collapsed state of the device shown in FIG. 1C through the partially collapsed state shown in FIG. 1B to the extended state shown in FIG. 1A. The release mechanism 28, which will also be described later, is configured for holding the legs of the strut assemblies in the collapsed state, but is selectively releasable to selectively release the strut assemblies when the container device is in an elevated position above the support surface 2. That action enables the base section 22 and the strut assemblies 26A and 26B connected thereto to automatically drop down with respect to the top section 24 so that the base section engages and is disposed on the support surface 2.

As mentioned earlier and as will also be described later the container device 10 includes a biasing mechanism 54 which assists gravity to facilitate the dropping down of the base section to the extended stated by providing a bias force onto the strut assemblies 26A and 26B to cause the leg sections 30 and 32 of each strut assembly to pivot with respect to each other from a splayed-in orientation (when in the collapsed and partially extended states like shown in FIGS. 1C and 1B, respectively) to the point that they are splayed-out in the fully extended position shown in FIG. 1A. The biasing mechanism 54 also serves to hold the legs 30 and 32 in the fully extended state so that the device 10 is stable and resistant to collapsing. The support assembly 20 also includes plural stops, to be described later, which prevent over-rotation of the legs of the strut assemblies past the fully extended (splayed-out angular orientation) state shown in FIG. 1A.

In accordance with one preferred aspect of the invention, the strut assemblies 26A and 26B are constructed and sized so that when the support assembly of the container device is in its extended state the tray 12 on the upper section is disposed and held sufficiently above the support surface 2 to be at a height, e.g., twenty-four inches, which can be conveniently and comfortably reached by a standing or sitting user so that any item within the tool tray can be a readily accessed. In the exemplary embodiment shown the length of the upper legs 30 is approximately 13 inches, and the length of the lower legs 32 is approximately 13 inches. It should be pointed out at this juncture that the legs can differ in construction, size and material, if desired.

When use of the container device 10 in its extended state is no longer required, e.g., it is desired to transport and store the device until it will be used again, the drop-down support assembly 20 can be manually collapsed (e.g., folded) as will be described later, whereupon the legs 30 and 32 of the strut sections 26A and 26B are pivoted with respect to each other in a second and opposite rotational direction from the first rotational direction until they are disposed parallel to each other in a side-by-side array, whereupon the container device 10 will be in its collapsed state like shown in FIG. 1C.

Figure 9:
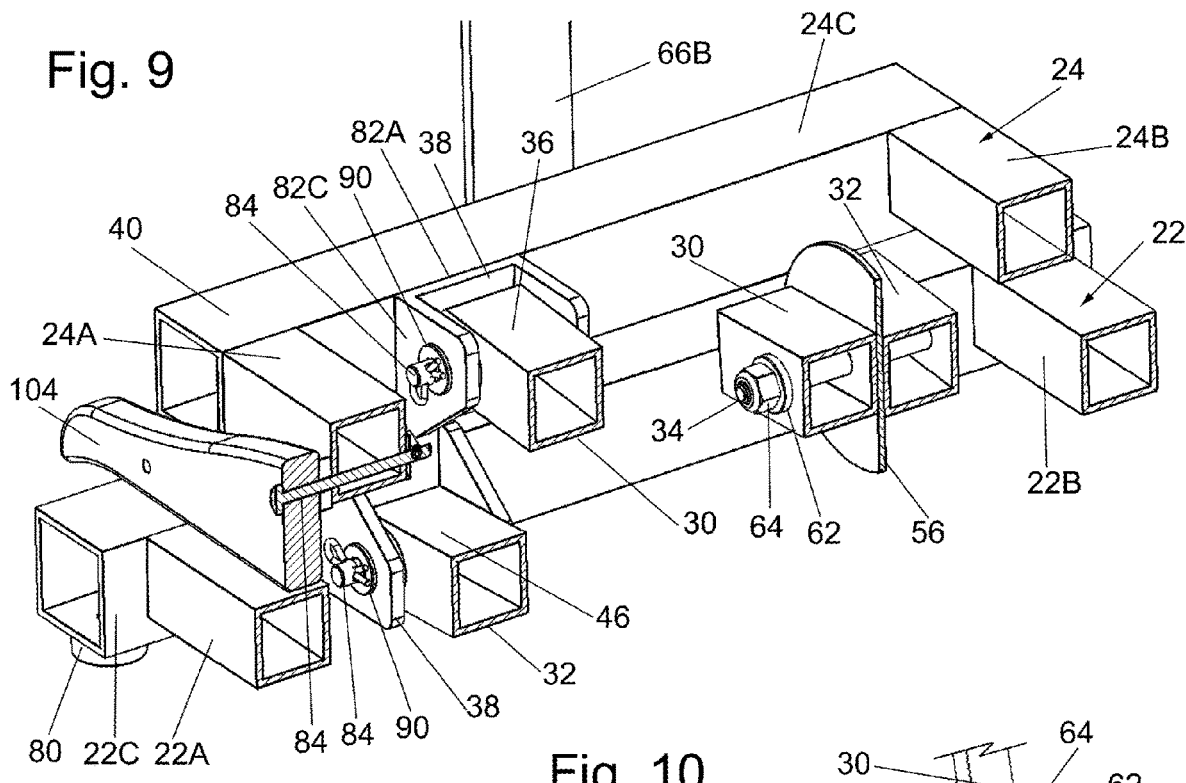
FIG. 9 is an enlarged isometric view taken along line 9-9 of FIG. 1C.
Figure 10:
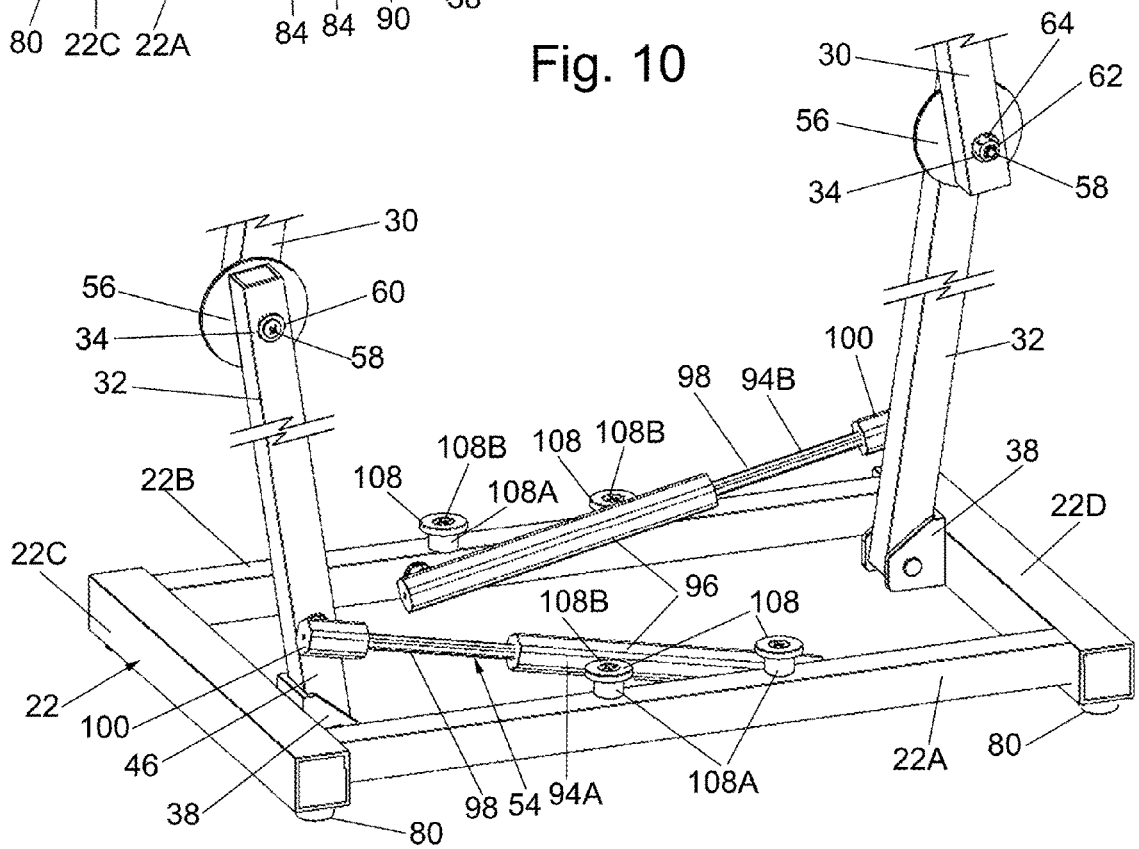
FIG. 10 is a reduced isometric view of the lower portion of the of the support assembly of FIG. 1A.

The pivot joint 34 of each strut assembly is best seen in FIGS. 1A, 9 and 10. It basically comprises an elbow washer 56, a pan-head Philip screw 58, a pair of flat washers 60 and 62, and a nylon insert lock nut 64. The elbow washer is formed of any suitable material, e.g., Nylon, and includes a central opening for receipt of the shaft of the screw 58. The shaft of the screw extends through a hole in the upper end of the lower leg 32 and a hole in lower end of the upper leg 30. The head of the screw is located adjacent the outer surface of the leg 32, with the washer 60 interposed therebetween. The nylon insert lock nut 64 is threadedly secured on the portion of the shaft of the screw located at the outer surface of the leg 30 with the washer 62 interposed therebetween. Thus, the central axis of the screw 58 forms the pivot axis of the pivot joint 34.

Attention is now directed to FIGS. 2, 4 and 5 where the details of the construction of the top section 24 will now be described. The top section comprises four elongated tubular sections, 24A, 24B, 24C and 24D that are formed of any suitable material strong-light weight material, e.g., aluminum. Those sections are fixedly secured, e.g., welded, to one another to form a rectangular frame, with the sections 24A and 24B forming the long sides of the frame and the sections 24C and 24D forming the short sides of the frame. The intersection of sections 24A and 24C form the heretofore-identified corner 40, whereas the intersection of the sections 24B and 24D form the heretofore-identified corner 44. In accordance with one exemplary embodiment of the device 10 the length of the long sides of the top frame is approximately 13.5 inches, and the length of the short sides of the top frame is approximately 7.5 inches. It should be pointed out at this juncture that the sections 24A-24D can differ in construction, size and material, if desired. For example, the length of all of the sections can be the same so that the frame assembly making up the top section 24 is of square shape. In fact, it should be noted that the frame making up the top section need not be a rectangle or square, but can be of any desired shape, whether regular or irregular, so long as the upper ends of the two strut assembles 26A and 26B are connected to somewhat diagonally to each other, like the diagonal arrangement of the exemplary embodiment shown in the figures of the drawing.

In accordance with one preferred embodiment of this invention the frame sections 24C and 24D forming the short sides of the top section 24 are configured to mount a handle 66 to the top section 24, so that the entire device 10 can be lifted by the handle and transported to whatever location is desired. The handle is best seen in FIGS. 1A, 2 and 5 is a fixed member, that basically comprises a top bar 66A, and pair of end bars 66B and 66C. The top bar 661 is an elongated member of circular profile and is formed of any suitable strong and light weight material, e.g., aluminum. It has a pair of ends 66D and 66E, each of which includes an internally threaded bore. The end bars 66B and 66C are of identical construction and each is in the form of an elongated strip formed of any suitable light weight and strong material, e.g., aluminum, having an upper end including a hole 66F through which a respective screw 68 can be extended. Thus, one screw can be extended through the hole 66F in the end bar 66B for threaded securement within the internally threaded bore in the end 66D of the top bar to secure that end bar to the top bar. Another screw 68 can be extended through the hole 66F in the other end bar 66C for threaded securement within the internally threaded bore in opposite end of the top bar to secure that end bar to the top bar. Each end bar includes a hole 66G at the lower end thereof for receipt of a respective screw 68 to secure the end bars to the sections 24C and 24D of the top frame section. A steel rivet nut 70 (FIG. 3) is threadedly secured on the threaded shaft of the screw to secure the end bar 66B to the frame section 24C. The other end bar 66C is secured to the frame section 24D of the top section in a similar manner. Thus, the handle 66 will be fixedly secured to the top section.

As best seen in FIG. 1A the tool tray 12 is a hollow body formed of any suitable material, e.g., a plastic. The body has a rectangular base wall 72 surrounded by a sidewall 74 which flares upward and outward slightly terminating in a flanged lip 76 The sidewall including two long sides 74A and 74B and two short sides 74C and 74D. A slot 78 is located in the middle of the flange portion that is contiguous with the short side 74C. A similar slot is located in the middle of the flange portion contiguous with the other short side 74D. Each slot 78 is configured to receive a portion of a respective end bar of the handle 66 to fixedly secure the tray 12 in place on the top section 24. It should be noted that the handle can be constructed so that it is pivotable or movable with respect to the top section 24. One such movable handle is used in the alternative container device 10', to be described later.

Attention is now directed to FIGS. 1A, 1B, 10 and 12 where the details of the construction of the base section 22 will now be described. That section comprises four elongated tubular sections, 22A, 22B, 22C and 22D, that are formed of any suitable material, e.g., steel or aluminum. Those sections are fixedly secured to one another in to form a rectangular frame, with the sections 22A and 22B forming the long sides of the frame and the sections 22C and 22D forming the short sides of the frame. The intersection of sections 22A and 22C form the heretofore-identified corner 48, whereas the intersection of the sections 22B and 22D form the heretofore-identified corner 52. In accordance with one exemplary embodiment of the container device 10 the length of the long sides of the base frame is approximately 13.5 inches, and the length of the short sides of the base frame is approximately 10 inches. The sections 22A-22D can differ in construction, size and material, if desired. For example, the length of all of the sections can be the same so that the frame making up the base section 22 is of square shape. In fact, the frame making up the base section need not be a rectangle or square, but can be of any desired shape, whether regular or irregular, so long as the lower ends of the two strut assemblies 26A and 26B are connected to somewhat diagonally to each other, like the diagonal arrangement of the exemplary embodiment shown in the figures of the drawing.

Figure 13:
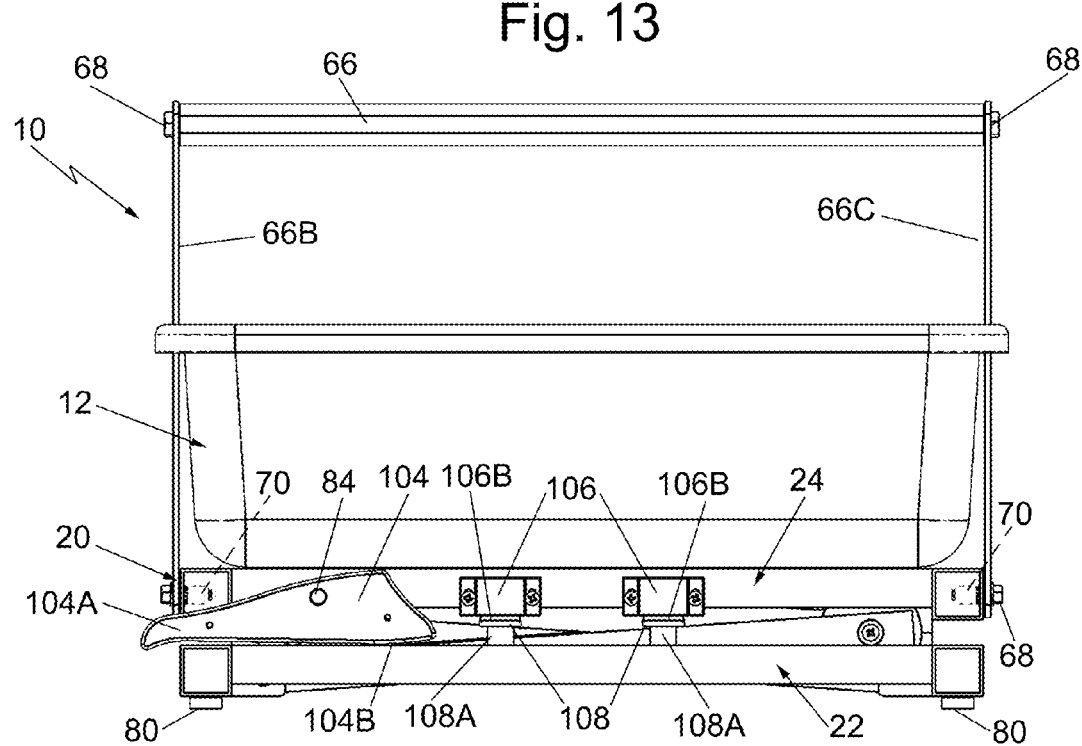
FIG. 13 is a front elevation view of the container device of FIG. 1A with its support assembly shown in its compact or collapsed state like shown in FIG. 1C ready to be actuated into fully extended state.
Figure 14:
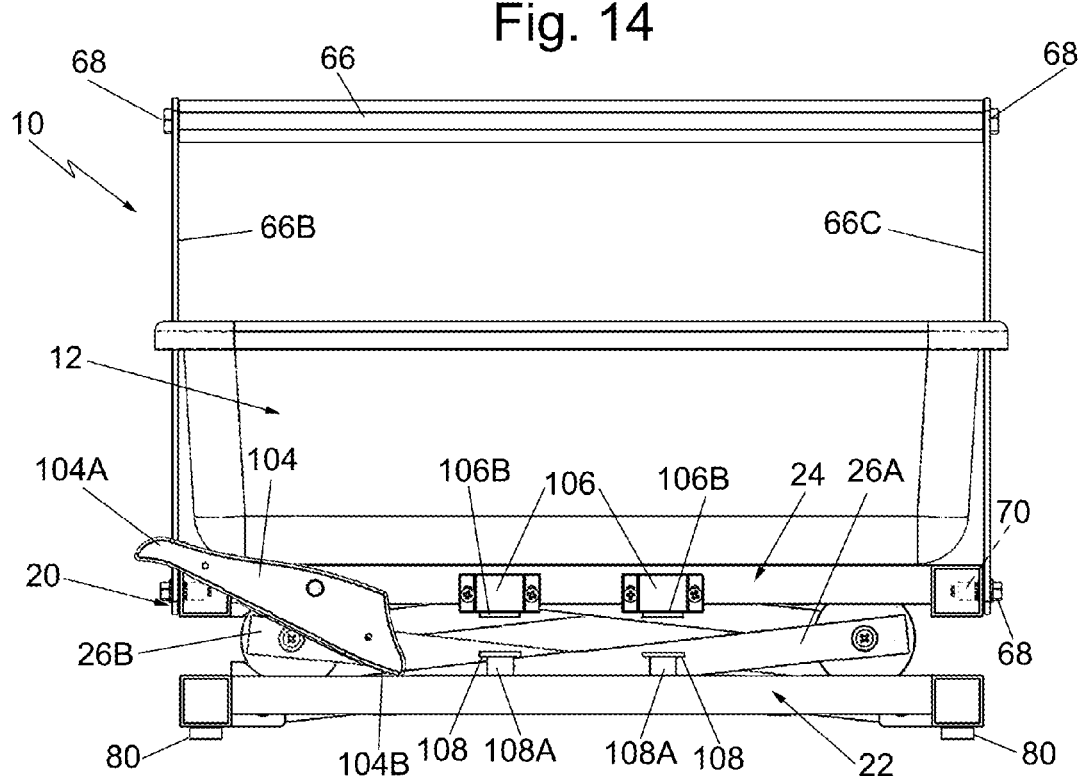
FIG. 14 is a front elevation view, like that of 13, but showing a release lever of the support assembly having been manually operated to release the drop-down support assembly so that it begins to assume its fully extended state.

The base section includes four rubber bumpers 80 (FIGS. 1A, 13 and 14) that are secured on the undersurface of the frame making up the base section at the four corners of the base section to provide protection for any floor on which the device 20 is disposed. The rubber bumpers are secured in place via respective fasteners, not shown.

Turning now to FIGS. 1A, 2, 6, 7, 9, 11 and 12, the details of the pivotable connection of the upper legs 30 to the frame making up the top section 24, and the pivotable connection of the lower legs 32 to the frame of the base section 22 will now be described. Each of those connections is accomplished in the same manner by a respective hinge 38. Thus, in the interest of brevity only the connection of the upper leg section 30 of strut assembly 26A to the frame section 24C of the top section 24 by hinge 38 will be described. As can be seen in FIG. 7 the hinge 38 basically comprises a bracket 82, a steel clevis pin 84, a nylon spacer 86, a flat steel washer 88, a stainless steel washer 90, and a steel cotter pin 92. As best seen in FIGS. 6 and 9, the center portion 82A of the bracket 82 is fixedly secured, e.g., welded, to the frame section 24C The clevis pin 84 is extended through a pair of aligned holes 82B in the flanges 82C of the bracket 82 and through a hole in the end portion 36 of leg section 30, with the head of the clevis pin located on the outer surface of one of the flanges of the bracket. The nylon spacer 86 is mounted on the shaft of the clevis pin interposed between the inner surface of that flange and one side of the leg section 30. The steel flat washer 88 is mounted on the clevis pin interposed between the other side of the leg section and the other flange of the bracket. The cotter pin 92 extends through a hole 84A at the end of the clevis pin opposite the clevis pin's head 84B, with the stainless steel washer 90 mounted on the clevis pin interposed between the other side of the other flange of the bracket and the cotter pin. Accordingly, the longitudinal axis of the clevis pin forms the pivot axis about which the leg section 30 can pivot with respect to the top frame.

It should be noted that the hinge 38, as described above, is merely exemplary of one type of hinge that can be used for pivotably mounting the legs of the strut assemblies to the frames of the top section and the base section. Thus, those hinges can be constructed of other components than those described so long as they enable the legs of the strut assemblies to which it is connected to pivot with respect thereto.

In order to restrict the leg sections 30 and 32 to a predetermined range of pivotable movement to the fully extended (splayed-out) state and thus insure stability of the device 10 when it is that state, the device 10 includes the heretofore-mentioned stops. Those stops are formed by the inner surface of the center portion 82A of each of the brackets 38. In particular, when the legs 30 and 32 are pivoted to the splayed-out state, portions of the leg sections immediately adjacent their associated brackets will engage the inner surface of the center portion 82A of those brackets to prevent further pivoting of the leg sections. Thus, over-rotation of the legs is prevented.

Figure 18:
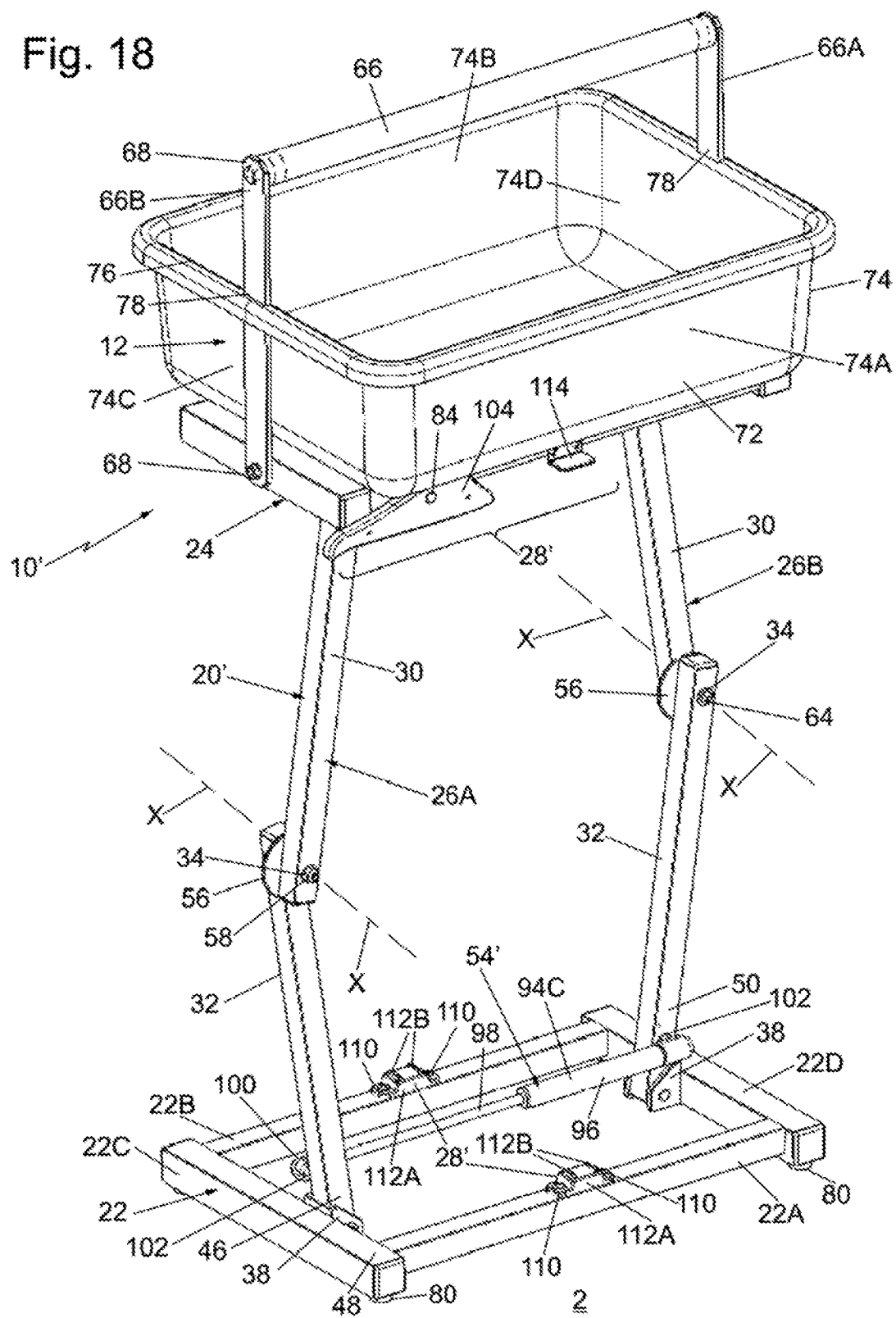
FIG. 18 is an isometric view similar to FIG. 1A but showing an alternative container device in the form of a tool tray; like that of FIG. 1A, mounted on an alternative support assembly constructed in accordance with this invention, with an alternative support assembly shown in its fully extended state supporting the tool tray at an elevated position above a support surface.

As mentioned earlier the biasing mechanism 54, not only assists gravity in the extension of the legs of the strut assemblies to their extended state by applying a bias force on the legs 32, but also serves to lock or hold the strut assemblies in that extended state. The biasing mechanism 54 is best seen in FIGS. 1A, 10 and 12, and is in the form of two gas-springs 94A and 94B, with the gas-spring 94A coupled to the strut assembly 26A and the gas-spring 94B coupled to the strut assembly 26B. In FIG. 18, there is shown an alternative embodiment of a container device 10' constructed in accordance with this invention. The container device 10' makes use of an alternative support assembly 20', wherein the support assembly includes a modified biasing mechanism 54' in the form of a single gas-spring 94C. The details and operation of that alternative container device and support assembly will be discussed later.

The support assembly 20 can make use of various conventional gas-springs for the two gas-springs 94. One particularly effective conventional gas-spring is a damped gas-spring available from Apexstone as the model 45N/10 lb 10 inch gas strut. Each gas-spring 94 basically comprises a cylinder 96 from which a piston rod 98 extends. The end of the piston rod that extends out of the cylinder terminates in an enlarged head 100. The opposite end of the piston rod is connected to a piston (not shown) within the cylinder. The piston has a bias force applied to it by a compressed gas located within the cylinder. A valve (not shown) is located in the cylinder and operates to enable oil to flow therethrough to dampen the extension of the piston out of the cylinder. The head 100 on the piston rod 98 of the gas-spring 94A is pivotably connected to the leg 32 of the strut assembly 26A closely adjacent the hinge 38 to which that leg is pivotably connected. That pivotable connection is achieved by means of an assembly 102. That assembly consists of a socket head cap screw, a hex nut, a flat washer and a rivet nut. The end of the cylinder 96 opposite the end from which the piston rod projects is pivotably connected to the section 22A of the frame of the base section 22 by a similar assembly 102. In a similar manner the head 100 at the end of the piston rod of the gas spring 94B is pivotably connected to the leg 32 of the strut assembly 26B closely adjacent the hinge 38 to which that leg is pivotably connected and the end of the cylinder opposite the end from which that piston rod projects is pivotably connected to the section 22B of the frame of the base section 22.

As should be appreciated by those skilled in the art, the compressed gas within each gas-spring applies a bias force onto the piston, from the piston to the piston rod and from the piston rod to the leg 32 of the associated strut assembly. When the container device 10 is in its collapsed state the bias force provided by the gas-spring onto leg 32 will be axially aligned with the pivot axis of the hinge 38. Thus, the bias force will be held in check. However, once the support assembly 20 is released from an elevated position as described earlier so that the strut assemblies and the base section start to drop down the bias force provided by the gas-spring will no longer be aligned with the pivot axis of the hinge, whereupon the bias force will be released to assist gravity in deploying the strut assemblies, i.e., pivoting the legs 30 and 32 to their splayed-out (extended) state shown in FIG. 1A, Not only do the gas-springs aid in the deployment of the legs to their extended position, they also add the advantage of dampening the movement of the legs during the deployment, thereby softening the deployment. In particular, the outward pivoting action of the legs of the strut assemblies will be dampened by the operation of the valve in the gas-spring so that the extension of the strut assemblies to their extended position will not result in an abrupt stop (i.e., a shock) as the legs 32 pivot into engagement with the stops 82A of the brackets 82. Once the strut assemblies are in their extended state they will be maintained in that state by the bias force provided by the gas-springs.

It must be pointed out at this juncture that other biasing means can be utilized to bias the legs of the strut assemblies in lieu of gas-springs. Such other biasing means can be conventional compression springs or any other means operable to provide a bias force to the legs of the strut assemblies to cause them to move from the splayed-in state to the extended (splayed-out) state and to be held in that state until collapsing of the strut assemblies back to the collapsed state is desired. Depending upon what type of biasing means is used in lieu of the disclosed gas-springs, such alternative biasing means may not provide a dampening effect to soften the extension of the strut assemblies to their extended state.

Attention is now directed to FIGS. 1A, 2, 4, and 11-14, whereupon the construction and operation of the release mechanism 28 will now be described. The release mechanism basically comprises an actuating lever 104, four magnetic catches 106 and four counter plates 108. The actuating lever 104 is best seen in FIG. 8 and basically comprises an elongated member including a handle portion 104A forming one end of the lever and an engagement surface 104B forming the other end of the lever. The lever is pivotably mounted on the section 24A of the frame of the top section 24 adjacent the corner 40 by a clevis pin 84 extending through a mid-portion of the lever into and through a hole in the frame section 24A. A nylon spacer 86 is mounted on the clevis pin interposed between the lever and the frame section. The clevis pin 84 is secured in place via a cotter pin 92, with a washer 90 interposed between the cotter pin and the frame section 24A.

Each of the magnetic catches 106 is of conventional construction, e.g., an EVERBILT magnetic catch available from The Home Depot. As best seen in FIGS. 3, 6 and 11, each magnetic catch 106 includes a plastic housing 106A (FIG. 6) holding a permanent magnet 106B. As best seen in FIGS. 10 and 12, each of the counter plates 108 is a flat washer formed of a ferromagnetic metal, e.g., steel. The housings of two of the magnetic catches 106 are fixedly secured by screws 110 to the outer surface of the frame section 24A of the top section 24. The housings of the other two of the magnetic catches 106 are similarly fixedly secured by screws 110 to the outer surface of the frame section 24B of the top section 24. Two of the counter plates 108 are mounted on respective nylon spacers 108A and fixedly secured by respective screws 108B (FIGS. 10 and 12) to the top surface of the frame section 22A of the base section 22. The other two of the counter plates are similarly mounted on the top surface of the frame section 22B of the base section 22. The four magnetic catches and the four counter plates are mounted so that they are axially aligned, whereupon when the support 20 is in its collapsed state, like shown in FIG. 1C, respective ones of the magnets of the magnetic catches will be in engagement with respective ones of the counter plates and will be held together by the magnetic attractive force therebetween. Accordingly, the magnetic attractive force will hold the top section 24 onto the base section 22 so that the device 10 will be in its collapsed state.

It should be noted at this juncture that other types magnetic catch arrangements can be utilized in lieu of the four magnetic catches 106 and the four counter plates 108. For example, the container assembly 10', which will be described in detail later, makes use an alternative release mechanism 28' having only two magnetic catches and two counter plates. In fact, this invention contemplates use of other releasably securable means for holding the base section against the top section in the collapsed state, like shown in FIG. 1C, but which by operation of the lever 104 or some other actuating means releases the base section from the top section so that it can drop therefrom as a result of gravity and assisted by the biasing mechanism.

The lever 104 is configured to break the magnetic attraction between the magnets of the magnetic catches and their associate counter plates by pivoting the lever from a normal "hold" state like shown in FIG. 1C, to a "release" state like shown in FIG. 1B. In particular, if the container device 10 is held in an elevated position about the support surface 2 and the handle of the lever 104 rotated in the rotational direction of the curved arrow in FIG. 14, the engagement surface 104B of the lever will engage and press down on a portion of the top surface of the frame section 22A of the base section 22. Continued rotation of the lever 104 in that rotational direction will force the base section 22 downward in the direction of the straight arrow in FIG. 14 and away from the top section 24 until the magnetic attractive force between the magnets and their associated counter plates is overcome. When that occurs gravity and the bias force provided by the gas-springs 94A and 94B will cause the strut assemblies to pivot to their fully extended position, whereupon the base section 22 will engage and be disposed on the support surface 2, with the tool tray 12 stably supported there-above by the extended support assembly 20 like shown in FIG. 1A, When the support assembly is in that extended state each of its strut assemblies will be splayed outward, i.e., the portions of the legs 30 and 32 at the hinge joint 34 of each strut assembly will be pointed outward and away from each other.

When the container device 10 is desired to be reconfigured or folded back into its collapsed state like shown in FIG. 1C, all that is required is for the user to hold down, e.g., step on, a portion of the base section to hold the base section firmly in place on the support surface 2. Grasping the handle the user then pushes the top section longitudinally until the strut assemblies are splayed inward at which point the top section can be collapsed or dropped downward, whereupon the legs of the strut assemblies completely fold up to the nested position shown in FIGS. 1C, 11 and 13, whereupon the magnets of the release mechanism engage the counter plates to hold the device 10 in that collapsed state. It should be noted that a user can collapse or fold up the container device by pushing inward on both splayed out strut assemblies at the same time or one at a time, to cause them to pivot inward with respect to each other together. In any case, once the legs of the strut assemblies become inwardly splayed, i.e., face each other, the top section can be pushed down to fold up the legs of the strut assemblies into the collapsed state.

As mentioned earlier the subject invention contemplates different types of containers that can be used with the support 20 of this invention. Three such containers are shown, namely, the tackle box 14 shown in FIG. 15, the soft tool bag 16 shown in FIG. 16 and the cooler 18 shown in FIG. 17. It must be noted that other containers for holding tools or other small items can be used with the support of this invention. If the container used includes a handle, like the embodiments shown in FIGS. 15-17, the handle 66 shown in FIGS. 1A-1C can be eliminated. In such a case the container, be it the tackle box 14, the soft tool bag 16, the cooler 18, or any other container having a handle, should be secured to the frame of the top section 24. Any suitable securement means for securing the container to the top section can be used, providing it is strong enough to resist separation between the container and the support 20 when the container device including the container having its own handle is lifted up by the handle of the container.

Figure 19:
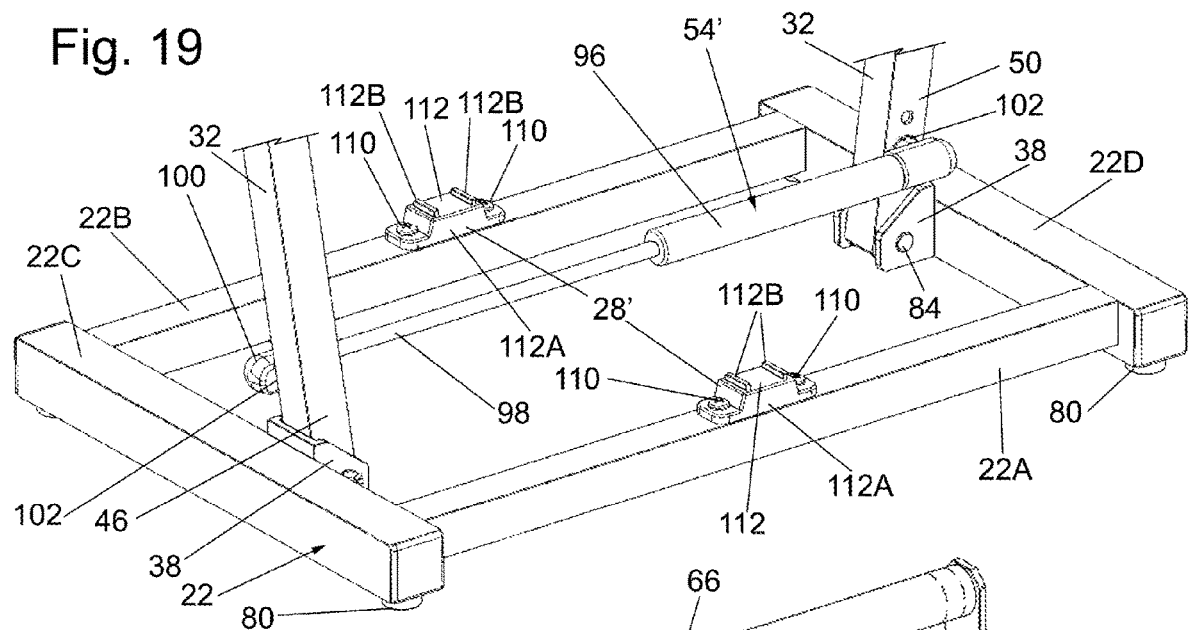
FIG. 19 is an enlarged isometric view of the lower portion of the of the alternative support assembly of FIG. 18.
Figure 20:
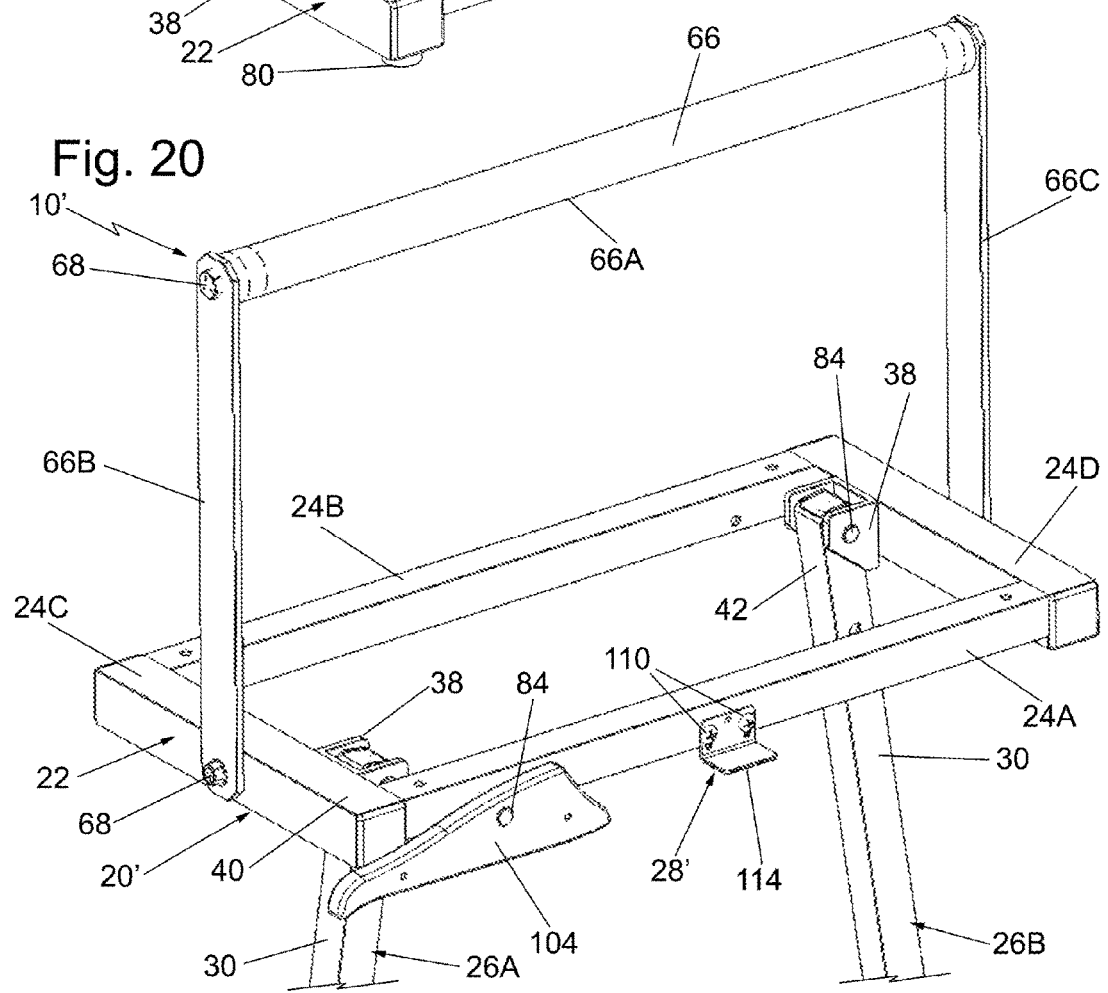
FIG. 20 is an enlarged isometric view of the top portion of the alternative support assembly of FIG. 18, but without the tool tray mounted thereon.

Turning now to FIG. 18, there is shown an alternative exemplary embodiment 10' of a container device constructed in accordance with this invention. The container device 10' is similar in most respects to the container device 10, except for the construction of the release mechanism and the biasing mechanism of the support assembly. The alternative support assembly is designated by the reference number 20', with the alternative release mechanism being designated by the reference number 28' and the alternative biasing mechanism being designated by the reference number 54'. In the interest of brevity the common features of the components making up the container device 10' with the container device 10 will be given the same reference numbers and a detailed description of their construction, arrangement and operation will not be reiterated. Thus, as can be seen the support assembly 20' includes a base section 22 to which the lower legs 32 of the strut assemblies 26A and 26B are pivotable connected by respective hinges 38. Those strut assemblies are configured to be biased to their extended position or state by only a single gas-spring 94C connected between the lower legs 32 of the two strut assemblies, in lieu of the two gas-springs 94A and 94B, biasing each of the strut assemblies in the support assembly 20. The gas-spring 94C is constructed similarly to gas-springs 94A and 94B. As best seen in FIG. 19 the head 100 of the gas-spring 94C is pivotably connected to the lower end 46 of the lower leg 32 of the strut assembly 26A by a pivotable assembly 102 like that described previously. The end of the cylinder 96 of the gas-spring 94C that is located opposite the piston rod 98 is pivotably connected to the lower end 50 of the lower leg 32 of the strut assembly 26B by another pivotable assembly 102. Accordingly, a bias force is provided by the gas-spring to the portions of the lower legs of the two strut assemblies 26A and 26B above the points at which those legs are pivotably connected by the hinges 38 to the frame sections 22C and 22D. That bias force causes the lower legs 32 of the strut assembly to pivot outward and away from each other when the base section 22 is released from the top section by the operation of the lever 104 of the release mechanism 28', which action results in the automatic extension of the strut-assemblies to their extended state as described above.

As mentioned above, the release mechanism 28' of the support assembly 20' is somewhat different. In particular, the release mechanism of the support assembly 20' makes use of two magnetic catches 112 and two ferromagnetic counter plates 114. It does, however, make use of the actuator lever 104 described above. In particular, one magnetic catch 112 is mounted on the top surface of the base frame section 22A at approximately the mid-point thereof. A second magnetic catch 112 is mounted on the top surface of the base frame section 22B at approximately the mid-point thereof. Each of the magnetic catches 112 is of conventional construction, e.g., a common magnetic catch available from McMaster. As best seen in FIG. 19 each magnetic catch 112 includes a plastic housing 112A holding a pair of permanent magnets 112B. Each housing is secured to the frame section by a pair of screws 110. Each counter plate 114 is a L-shaped member formed of a ferromagnetic material, e.g., steel, and is fixedly secured to the outer surface of the frame sections 24A and 24B of the top section 24, so that they are axially aligned with the magnets of the magnetic catches 112. In particular, the upstanding wall portion of one of the two L-shaped counter plates is secured, via screws 110, to the outer surface of the frame section 24A of the top section 24 at approximately the middle thereof so that the horizontally extending flange portion of that counter plate is axially aligned with the magnets of the magnetic catch 112 mounted on the base frame section 22A. In a similar manner the upstanding wall portion of the other L-shaped counter plate is secured, via screws 110, to the outer surface of the frame section 24B of the top section 24 at approximately the middle thereof so that the horizontally extending flange portion of that counter plate is axially aligned with the magnets of the magnetic catch 112 mounted on the base frame section 22B. Accordingly, when the container device 10' is in its collapsed state (like that shown in FIG. 1A for the container device 10) the counter plates 114 will be in magnetic engagement with the magnets 112 and will be held together by the magnetic attractive force therebetween. The operation of the container device 10' is identical to the operation of the container device 10. Thus, when the container device is to be opened from its collapsed state to its extended state it is held above the support surface 2 and its actuating lever 104 pivoted as described above. That action moves the base section 22 away from the top section 24 and thereby breaks the magnetic attraction between the magnets and the counter plates, whereupon the base section drops down to the extended position as described above. Collapsing of the container device 10' from its extended state back the its collapsed state is accomplished in an identical manner as that of the container device 10 described above.

Figure 21:
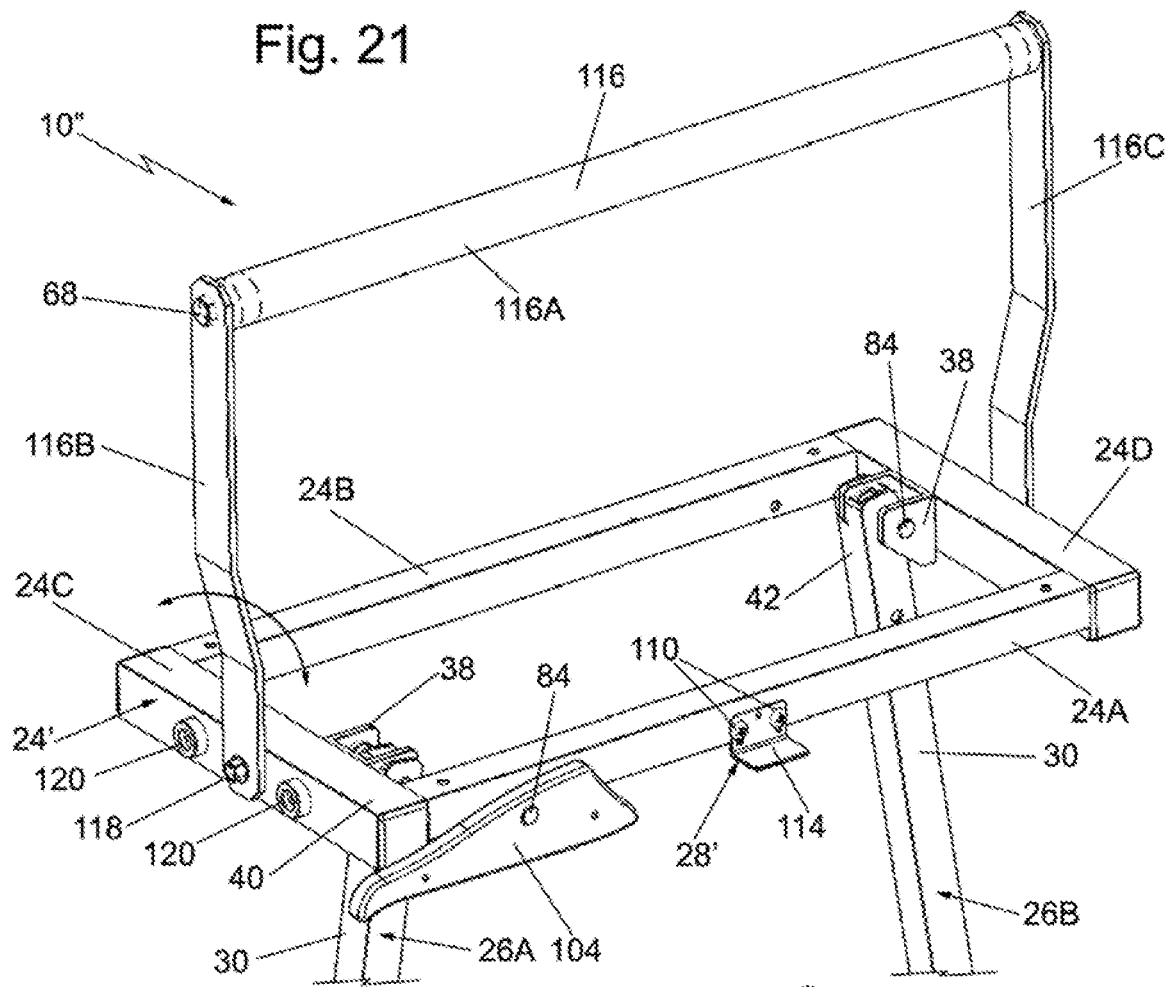
FIG. 21 is an isometric view similar to FIG. 20, but showing an alternative top section of the alternative support assembly of FIG. 18, namely; a top section with a pivotable handle.
Figure 22:
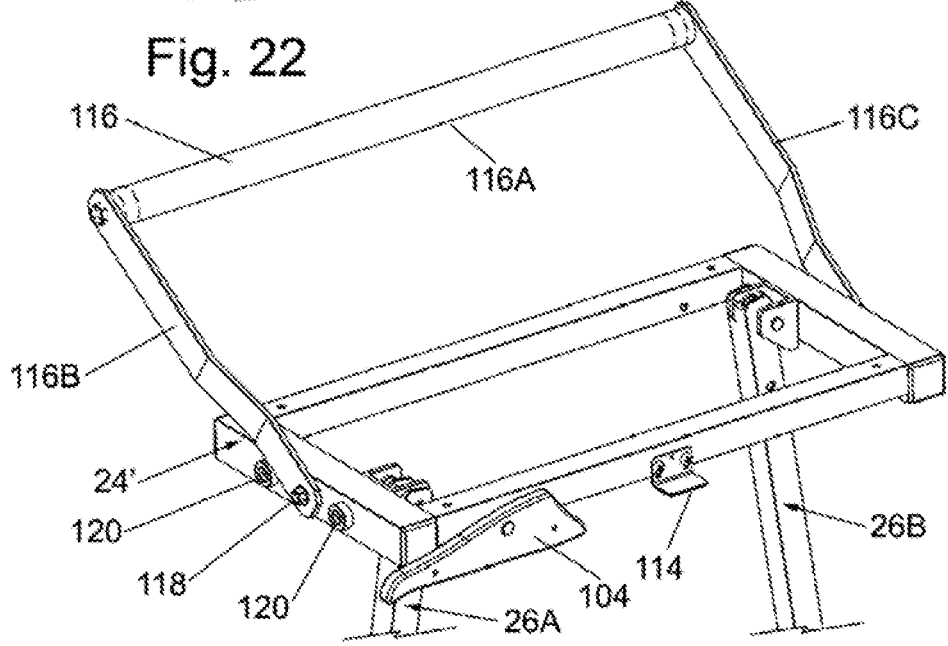
FIG. 22 is a reduced isometric view of the alternative top section, but showing the pivotable handle pivoted to one retracted position.

In FIG. 21 there is shown the upper portion of another alternative embodiment of a container device 10" constructed in accordance with this invention. The container device 10" is identical in all material respects to the container device 10', except for the construction of the top section of the support assembly. In this regard the top section of the support assembly of the container device 10", which is designated by the reference number 24', makes use of a pivotable handle 116 in lieu of the fixed handle 66 described earlier. In the interest of brevity the common features of the components making up the container device 10" will be given the same reference numbers as the comparable components of the container device 10' and a detailed description of their construction, arrangement and operation will not be reiterated. Thus, as can be seen the handle 116 basically comprises a top bar 116A, and pair of end bars 116B and 1160. The top bar 116A is an elongated member of circular profile and is formed of any suitable strong and light weight material, aluminum. It has a pair of ends each of which includes an internally threaded bore (not shown). The end bars 116B and 116C are of identical construction and each is in the form of an elongated strip formed of any suitable light weight and strong material, e.g., aluminum, having an offset upper end including through which a respective screw 68 can be extended. Thus, one screw 68 can be extended through the hole in the off-set upper end of the end bar 116B for threaded securement within the internally threaded bore in one end of the top bar to secure that end bar to the top bar. Another screw 68 can be extended through the hole in the off-set upper end of other end bar 1160 for threaded securement within the internally threaded bore in opposite end of the top bar to secure that end bar to the top bar. Each end bar includes a hole (not shown) at the lower end thereof for receipt of a respective flanged head cap screw 118 to pivotably secure the end bars to the sections 24C and 24D of the top frame section. A steel rivet nut (not shown) threadedly secured on the threaded shaft of the cap screw 118 to pivotably secure the end bar 116E to the frame section 24C. The other end bar 116C is pivotably secured to the frame section 241) of the top section in a similar manner. Thus, the handle 116 will be pivotably secured to the top section 24' and can be pivoted about the axis Y in either rotational direction shown by the double-headed arrow in FIG. 21. A pair of rubber stops 120 is fixedly secured to the outer surface of the frame section 24C equidistantly spaced on opposite sides of the axis Y. A similar pair of rubber bumpers is fixedly secured to the outer surface of the frame section 24C equidistantly spaced on opposite sides of the axis Y. The bumpers form stops that serve to restrict the range of pivoting motion of the handle 116. FIG. 22 shows the handle 116 pivoted to one end of its range of motion, i.e., pivoted to the orientation wherein the lower portion of the end bars 116B and 1160 of the handle are in contact with the bumpers 120 on the frame sections 24C and 24D, respectively, located closest to the frame section 24B. With the handle pivoted to either end of its range of motion the top section 24' will be exposed so that any type of container or other object can be disposed thereon and secured in place by any suitable means. Then the handle 116 can be pivoted to the orientation where it extends perpendicularly to the plane of the top section 24' so that the handle can be used to carry the device to any location desired. Moreover, it is contemplated that a top section 24' of the support assembly constructed with a pivotable handle like that of FIG. 21 can be used with any type of container shaped like the tool tray 12, e.g., with a peripheral flange 76, but without the slots 78 in the flange to accommodate the end bars of the handle. Thus, for such an application, with the handle 116 can be pivoted to the orientation so that it is perpendicular to the plane of the top section, A pair of clips (not shown) can then be provide for mounting on the off-set portions of the end bars to releasably engage respective portions of the flange of the container located immediately adjacent those end bars to thereby secure that container in place on the top section 24.

Figure 23:
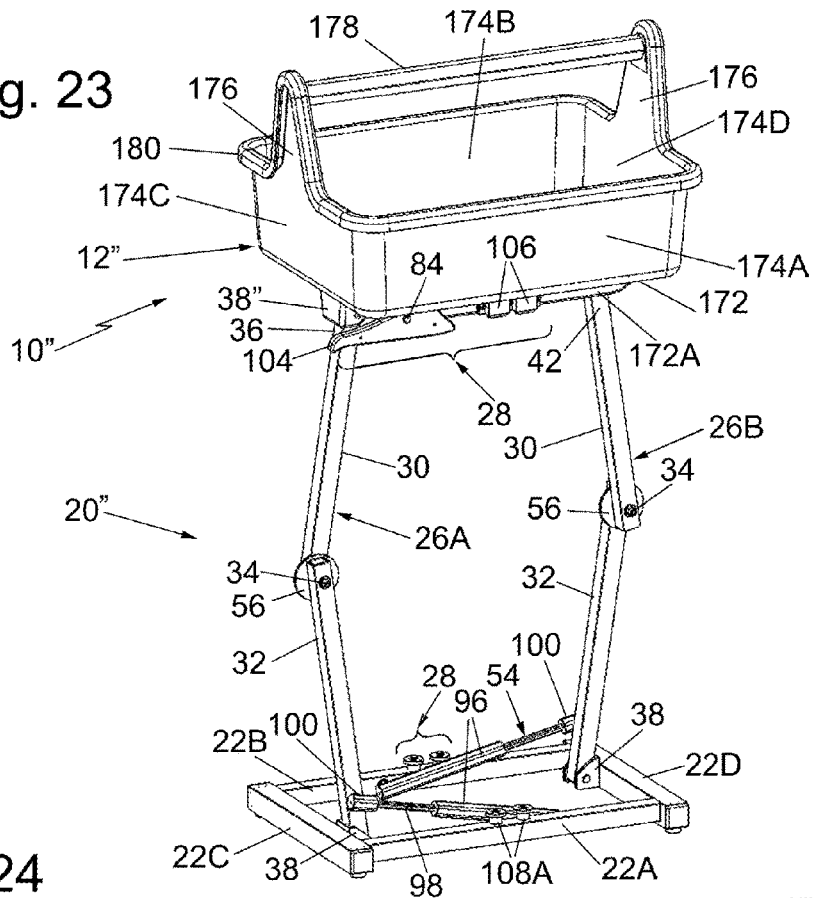
FIG. 23 is an isometric view, similar to FIG. 1A, but showing another alternative container device constructed in accordance with this invention, with a portion of the container forming the top section of support assembly, and with that support assembly being shown in its fully extended state.
Figure 24:
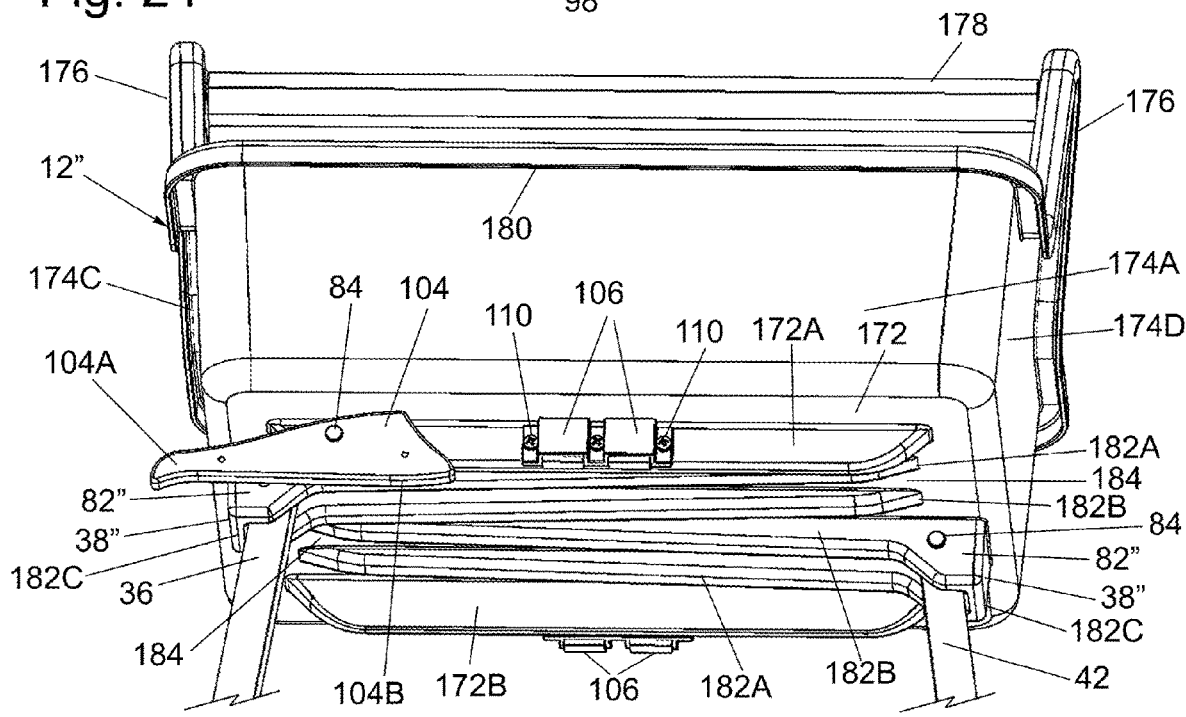
FIG. 24 is an enlarged partial isometric view taken from an upward oblique angle showing the container device of FIG. 23 with the upper portion of the support assembly being shown in its fully extended state.

Turning now to FIG. 23, there is shown another alternative exemplary embodiment 10" of a container device constructed in accordance with this invention. The container device 10" basically comprises an alternative container 12" and an alternative support assembly 20". In the interest of brevity the components of the container device 10" that are common with the components of the container device 10 will be given the same reference numbers and the details of their construction, arrangement and operation will not be reiterated in the interest of brevity. Suffice it for now to state that the container device 10" is similar in most respects to the container device 10 except that the bottom of the container 12" itself forms the top section of the support assembly 20", and the actuating lever 104 and the four magnetic catches 106 of the release mechanism 28 are mounted on portions of the bottom wall of the container 10".

Figure 25:
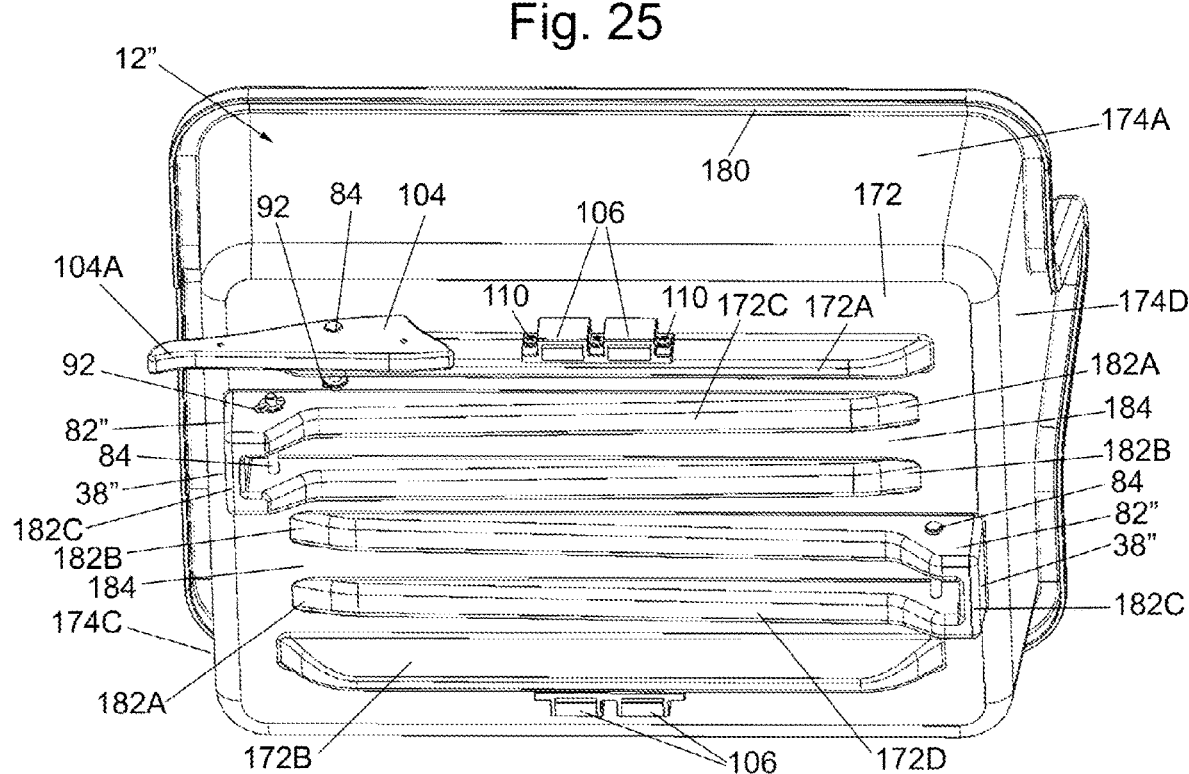
FIG. 25 is a partial isometric view similar to FIG. 24 but taken from another upward oblique angle with portions of the support assembly removed to show features of the container forming the top section of the support assembly.

As best seen in FIG. 23 the container 12" is in the form of a tool tray having a hollow body formed of any suitable material, e.g., a plastic. The body is an integral member that has a rectangular base wall 172 surrounded by a sidewall 174 that flares upward and outward slightly. The sidewall includes two long sides 174A and 174B and two short sides 174C and 174D. Each short side includes a projection 176 extending upward therefrom. A bar 178 forming a handle is located between the upper ends of the projections 176. The peripheral edge of the sidewall 174 and the projections 176 is in the form of a rounded flange 180, The base wall 172 forms the top section of the support assembly 20". To that end, as best seen in FIG. 25 the base wall 172 includes a linear wall section 172A projecting downward therefrom and extending parallel to and closely adjacent the long side 174A. The actuating lever 104 is pivotably mounted on the wall section 172A adjacent the corner formed by the sides 174A and 174C in a similar manner to the manner by which the actuating lever 104 is mounted on the top section 22 of the container assembly 10. In particular, the lever 104 is mounted on the wall section 172A by a clevis pin 84 extending through a mid-portion of the lever into and through a hole in the wall section 172A, with a nylon spacer 86 is mounted on the clevis pin interposed between the lever and the outer side of the wall section 172A. The clevis pin 84 is secured in place via a cotter pin 92 on the opposite (inner) side of the wall section 172A. A washer 90 is interposed between the cotter pin and the inner side of the wall section 172A. The housings of two of the magnetic catches 106 are fixedly secured by screws 110 to the outer side of the wall section 172A at approximately the middle thereof. Another wall section 172B, similar in construction to wall section 172A, projects downward from the bottom wall 172 and extending parallel to and closely adjacent the long side 174B. The housings of the other two of the magnetic catches 106 are fixedly secured by screws 110 to the outer side of the wall section 172B at approximately the middle thereof.

Figure 26:
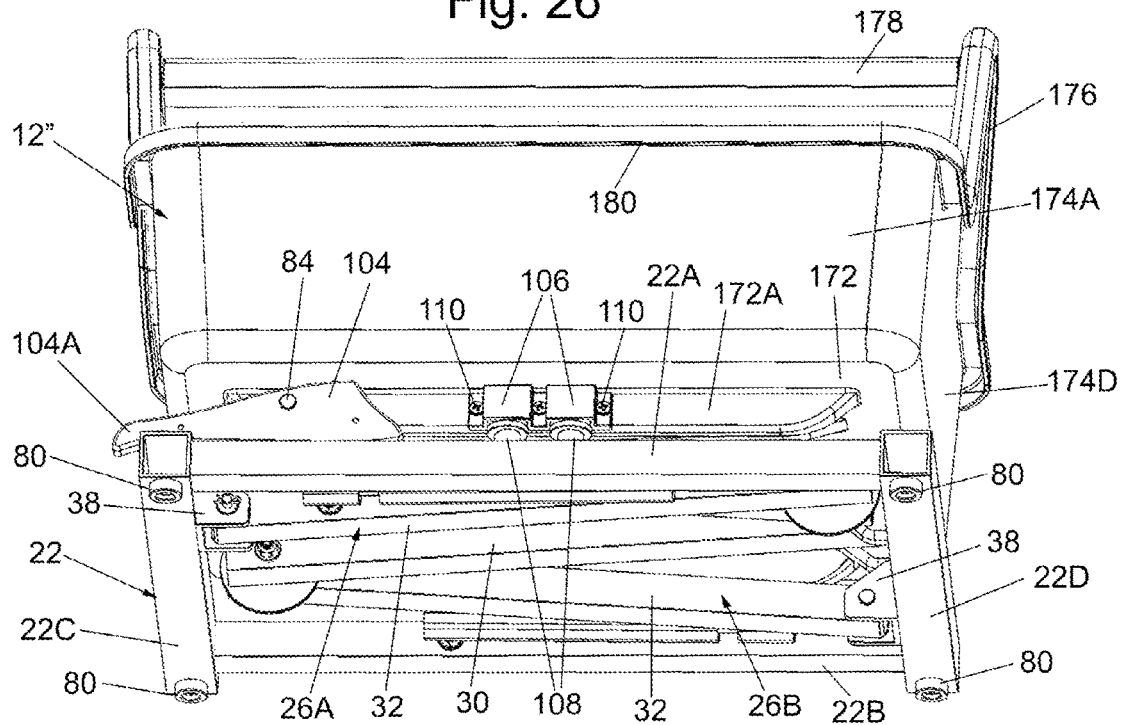
FIG. 26 is a partial isometric view, similar to FIG. 24 and taken from the same upward oblique angle, showing the alternative container device of FIG. 23 with the support assembly thereof being shown in its retracted or collapsed state.

A first elongated. U-shaped wall section 172O projects downward from the bottom wall 172 and includes a pair of parallel long sidewalls 182A and 182B and an intermediate short end wall 182C. The sidewall 182A extends parallel and close to the wall section 172A. The sidewall 182B is spaced from the sidewall 182A to form channel 184 therebetween. The height of each sidewall 182A and 182B flares upward from the end of those sidewalls closest to the side 174D of the tray 12" to a point closely adjacent the end wall 182C. The end wall 182C interconnects the sidewalls 182A and 182B. The portions of the sidewalls 182A and 182B immediately adjacent the end wall 182C flare upward at a greater angle to form a bracket 82" of a hinge 38". The hinge 38" pivotably connects the top portion 36 of the upper leg 30 of the strut assembly 26A to bottom wall of the container 12" adjacent the corner formed by the sides 174A and 174C. A steel clevis pin 84 extends through a pair of aligned holes in bracket and through a hole in the end portion 36 of leg section 30, with the head of the clevis pin located on the outer surface of one of the sides of the bracket. A cotter pin 92 extends through a hole at the end of the clevis pin opposite the clevis pin's head, with a stainless steel washer mounted on the clevis pin interposed between the other side of the bracket 82" and the cotter pin. Accordingly, the longitudinal axis of the clevis pin forms the pivot axis about which the upper leg section 30 of the strut assembly 26A can pivot with respect to the container 12", with the channel 184 receiving that upper leg section 30 when the support assembly 20" is in its collapsed state like shown in FIG. 26.

A second elongated U-shaped wall section 172D projects downward from the bottom wall 172 and is constructed identically to the wall section 172C, i.e., it includes a pair of parallel long sidewalk 182A and 182B and an intermediate short end wall 182C. The sidewall 182A extends parallel and close to the wall section 172B, with the end wall lying closely adjacent the side 174D of the tray 12". The hinge 38" of the wall section 172D pivotably connects the top portion 42 of the upper leg 30 of the strut assembly 26B to bottom wall of the container 12" adjacent the corner formed by the sides 174B and 174D by means of the steel clevis pin 84 and associated components like that of the wall section 172C. Accordingly, the longitudinal axis of the clevis pin forms the pivot axis about which the upper leg section 30 of the strut assembly 26B can pivot with respect to the container 12", with the channel 182 receiving that upper leg section 30 when the support assembly 20" is in its collapsed state like shown in FIG. 6.

Operation of the container device 10" is identical to that described earlier with respect to the container device 10. To that end, when container device is held in its collapsed state above the support surface 2 on which it is to be disposed, the handle portion 104A of the lever 104 can be pivoted upward to cause the engagement surface 104B to press downward on the frame 22 and thereby break the magnetic attraction between the magnets of the magnetic catches 106 and their associate counter plates 108. When that occurs gravity and the bias force provided by the gas-springs 94A and 94B will cause the strut assemblies to pivot to their fully extended position, whereupon the base section 22 will engage and be disposed on the support surface 2, with the tray 12" stably supported there-above by the extended support assembly 20" like shown in FIG. 23. When the container device is no longer required to be in its extended state, its support assembly can be readily collapsed in the same manner as described above.

As should be appreciated by those skilled in the art from the forgoing, the legs of the strut assemblies of the subject invention, being configured to collapse and fold up for nesting with each other, provide an unobtrusive and compact position for more convenient transport and storage. Furthermore this configuration is highly reliable and designed to enhance appearance. It should be noted that this invention contemplates other ways in addition to or in lieu of the gas-springs to lock the legs of the strut assemblies in the extended position. Such other types of locking means may be mechanical means, such knobs, latches, and the like. While such structures bring with them extra complexity, cost and operational demands of the user some applications, e.g., industrial application wherein the items to be supported in the container are very heavy, may necessitate additional locking means, where some sacrifice regarding convenience is accepted for the sake of achieving a more robust device. It should also be noted that wheels or casters may be added to the base section of the support assembly in order to add another level of movement flexibility. Moreover, while not shown in all of the figures of the drawing, the exposed ends of each of the frame sections making up the top section and each of the exposed ends of each of the frame sections making up the base section may include a plastic cap to close off those ends.

Without further elaboration the foregoing will so fully illustrate my invention that others may, by applying current or future knowledge, adopt the same for use under various conditions of service.

I claim:

1. A drop-down support device configured to mount a container thereon whereupon the container is secured thereto, the container being configured to hold one or plural items therein, said support device comprising:
   a base section configured for disposition spaced above a support surface;
   a top section disposed above said base section, said top section forming a portion of said container or the container being a separate component from said top section but secured to said top section by means for securing the container to said top section;

a first strut assembly and a second strut assembly, each of said strut assemblies having an upper end portion and a lower end portion and comprising a pair of strut sections pivotably connected together, said upper end portion of said first strut assembly being pivotably connected to a first portion of said top section, said upper end portion of said second strut assembly being pivotably connected to a second portion of said top section, said lower end portion of said first strut assembly being pivotably connected to a first portion of said base section, said lower end portion of said second strut assembly being pivotably connected to a second portion of said base section, said upper end portions and said lower end portions of said strut assemblies being pivotable with respect to each other in a first rotational direction from a collapsed state to an extended state, and pivotable with respect to each other in a second and opposite rotational direction from said extended state to said collapsed state;

a biasing mechanism;

a release mechanism configured for holding said strut assemblies in said collapsed state with said base section spaced above the support surface, said release mechanism being selectively releasable by a user of said support device to selectively release said strut assemblies when said support device is in an elevated position with said base section spaced above the support surface, whereupon said upper end portions and said lower end portions of said strut assemblies automatically pivot with respect to each other in said first rotational direction from said collapsed state to said extended state as a result of gravity and with the assistance of said biasing mechanism, whereupon said base section drops down to engage and be disposed on the support surface, with said top section disposed substantially above said base section to enable the user to have ready access the container from a standing position; and said support device with said container secured thereto comprising either a handle of said support device or a handle of the container, whereupon said support device with the container secured thereto is portable.

2. The drop-down support device of claim 1, wherein said second portion of said top section is located diagonally to said first portion of said top section, and said second portion of said base section is located diagonally to said first portion of said base section.

3. The drop-down support device of claim 1, wherein said biasing mechanism comprises a spring biasing assembly for providing a bias force to at least one of said strut assemblies for holding said strut assemblies in said extended state.

4. The drop-down support device of claim 3, wherein said spring biasing assembly comprises at least one gas-spring.

5. The drop-down support device of claim 3, wherein said support device is configured to enable a user to overcome said bias force on said strut assemblies to cause said upper end portions and said lower end portions of said strut assemblies to pivot with respect to each other in said second and opposite rotational direction from said extended state to said collapsed state.

6. The drop-down support device of claim 1 additionally comprising a stop configured to be engaged by said strut assemblies when said strut assemblies are in said extended state.

7. The drop-down support device of claim 1, wherein said container is selected from one of the group consisting of a tray, a tackle box, a tool bag, and a thermally insulated container.

8. The drop-down support device of claim 1, wherein said release mechanism comprises a manually operable release member and a magnet assembly, said magnet assembly including a first member secured to said top section and a second member secured to said base section, said first and second members being configured to be held together by a magnetic attractive force therebetween, said manually operable release member being configured to be moved from a hold state to a release state, whereupon the movement of said manually operable release member to said release state when said support device is in said elevated state above the support surface moves said second member away from said first member and overcomes said magnetically attractive force therebetween so that said base section drops from said top section and said strut assemblies pivot to said extended state.

9. The drop-down support device of claim 8, wherein said manually operable release member comprises a lever, and wherein at least one of said first and second members of said magnet assembly comprises a permanent magnet.

10. A drop-down support device configured to mount a container thereon, the container being configured to hold one or plural items therein, said support device comprising:

a base section configured for disposition on a support surface;

a top section disposed above said base section, said top section forming a portion of said container or being a separate component configured for receipt of the container thereon;

a first strut assembly and a second strut assembly, each of said strut assemblies having an upper end portion and a lower end portion and comprising a pair of strut sections pivotably connected together, said upper end portion of said first strut assembly being pivotably connected to a first portion of said top section, said upper end portion of said second strut assembly being pivotably connected to a second portion of said top section, said lower end portion of said first strut assembly being pivotably connected to a first portion of said base section, said lower end portion of said second strut assembly being pivotably connected to a second portion of said base section, said upper end portions and said lower end portions of said strut assemblies being pivotable with respect to each other in a first rotational direction from a collapsed state to an extended state, and pivotable with respect to each other in a second and opposite rotational direction from said extended state to said collapsed state;

a biasing mechanism, and a release mechanism configured for holding said strut assemblies in said collapsed state but being selectively releasable by a user of said support device to selectively release said strut assemblies when said support device is in an elevated position above the support surface, whereupon said upper end portions and said lower end portions of said strut assemblies automatically pivot with respect to each other in said first rotational direction from said collapsed state to said extended state as a result of gravity and with the assistance of said biasing mechanism, whereupon said base section drops down to engage and be disposed on the support surface, with said top section disposed substantially above said base section to enable the user to have ready access the container from a standing position, wherein said release mechanism comprises a manually operable release member and a magnet assembly, said magnet assembly including a first member secured to said top section and a second member secured to said base section, said first and second members being configured to be held together by a magnetic attractive force therebetween, said manually operable release member being configured to be moved from a hold state to a release state, whereupon the movement of said manually operable release member to said release state when said support device is in said elevated state above the support surface moves said second member away from said first member and overcomes said magnetically attractive force therebetween so that said base section drops from said top section and said strut assemblies pivot to said extended state.

11. The drop-down support device of claim 10, wherein said manually operable release member comprises a lever, and wherein at least one of said first and second members of said magnet assembly comprises a permanent magnet.

\* \* \* \* \*